US011960990B2

(12) United States Patent
Megretski et al.

(10) Patent No.: US 11,960,990 B2
(45) Date of Patent: Apr. 16, 2024

(54) ARTIFICIAL NEURAL NETWORK IMPLEMENTATIONS

(71) Applicant: NanoSemi, Inc., Waltham, MA (US)

(72) Inventors: Alexandre Megretski, Concord, MA (US); Alexandre Marques, Wayland, MA (US)

(73) Assignee: NanoSemi, Inc., Waltham, MA (US)

( * ) Notice: Subject to any disclaimer, the term of this patent is extended or adjusted under 35 U.S.C. 154(b) by 647 days.

(21) Appl. No.: 16/944,698

(22) Filed: Jul. 31, 2020

(65) Prior Publication Data

US 2022/0036176 A1 Feb. 3, 2022

(51) Int. Cl.
*G06N 3/08* (2023.01)
*G06N 3/04* (2023.01)

(52) U.S. Cl.
CPC ............... *G06N 3/08* (2013.01); *G06N 3/04* (2013.01)

(58) Field of Classification Search
CPC ............ G06N 3/08; G06N 3/04; G06N 3/048
See application file for complete search history.

(56) References Cited

U.S. PATENT DOCUMENTS

| 4,979,126 | A | 12/1990 | Pao et al. |
| 10,523,159 | B2 | 12/2019 | Megretski et al. |
| 11,494,622 | B2* | 11/2022 | Li ..................... G06N 3/063 |
| 2019/0114531 | A1* | 4/2019 | Torkamani ............. G16H 20/40 |
| 2019/0348956 | A1* | 11/2019 | Megretski ............. H03F 1/3282 |
| 2020/0005143 | A1* | 1/2020 | Zamora Esquivel .. G06N 3/048 |
| 2020/0034714 | A1* | 1/2020 | Bae .......................... G06F 18/24 |
| 2020/0364545 | A1* | 11/2020 | Shattil ..................... G06F 17/16 |
| 2020/0410295 | A1* | 12/2020 | Baker .................... G06N 3/048 |
| 2021/0295134 | A1* | 9/2021 | Stevens .............. G06F 7/49973 |

OTHER PUBLICATIONS

Dr Anthony Yeates, Approximation Theory III/IV, May 8, 2015 (Year: 2015).*
Amin, Hesham, K. Memy Curtis, and Barrie R. Hayes-Gill. "Piecewise linear approximation applied to nonlinear function of a neural network." IEE Proceedings—Circuits, Devices and Systems 144, No. 6 (1997): 313-317.

(Continued)

*Primary Examiner* — Abdullah Al Kawsar
*Assistant Examiner* — Tewodros E Mengistu
(74) *Attorney, Agent, or Firm* — Occhiuti & Rohlicek LLP

(57) ABSTRACT

Disclosed are systems, methods, and other implementations that include a machine-implemented artificial neural network including a plurality of nodes, with the nodes forming at plurality of layers including an input layer, at least one hidden layer, and an output layer, and a plurality of links, with each link coupling a corresponding source node and a receiving node. At least one link is configured to evaluate a piecewise linear function of a value provided by a first source node, from the plurality of nodes, to yield a value for a first receiving node coupled to the at least one link. Each node of a hidden layer is configured to aggregate values provided by links for which that node is the receiving node of the link, with the first receiving node providing non-linear output resulting, in part, from the at least one link configured to evaluate the piecewise linear function.

21 Claims, 12 Drawing Sheets

(56) References Cited

OTHER PUBLICATIONS

Becerra-Alonso, David, Mariano Carbonero-Ruz, and Francisco Fernández-Navarro. "Using Extreme Learning Machines to cluster supervised data before classification." No Lineal 2016 (2016): 19.

Braun, Jürgen, and Michael Griebel. "On a constructive proof of Kolmogorov's superposition theorem." Constructive approximation 30, No. 3 (2009): 653.

Cirrincione, Giansalvo, Vincenzo Randazzo, and Eros Pasero. "The Growing Curvilinear Component Analysis (GCCA) neural network." Neural Networks 103 (2018): 108-117.

Demartines, Pierre, and Jeanny Herault. "Curvilinear component analysis: A self-organizing neural network for nonlinear mapping of data sets." IEEE Transactions on neural networks 8, No. 1 (1997): 148-154.

Dong, Dong, and Thomas J. McAvoy. "Nonlinear principal component analysis-based on principal curves and neural networks." Computers & Chemical Engineering 20, No. 1 (1996): 65-78.

Girosi, Federico, and Tomaso Poggio. "Representation properties of networks: Kolmogorov's theorem is irrelevant." Neural Computation 1, No. 4 (1989): 465-469.

Grossberg, Stephen. "Nonlinear neural networks: Principles, mechanisms, and architectures." Neural networks 1, No. 1 (1988): 17-61.

Han, Song, Xingyu Liu, Huizi Mao, Jing Pu, Ardavan Pedram, Mark A. Horowitz, and William J. Dally. "EIE: efficient inference engine on compressed deep neural network." ACM SIGARCH Computer Architecture News 44, No. 3 (2016): 243-254.

He, Juncai, Lin Li, Jinchao Xu, and Chunyue Zheng. "Relu deep neural networks and linear finite elements." arXiv preprint arXiv:1807.03973 (2018).

Hecht-Nielsen, Robert. "Counterpropagation networks." Applied optics 26, No. 23 (1987): 4979-4984.

Hunt, Kenneth J., D. Sbarbaro, R. ?bikowski, and Peter J. Gawthrop. "Neural networks for control systems—a survey." Automatica 28, No. 6 (1992): 1083-1112.

Jain, Anil K., and Jianchang Mao. "Artificial neural network for nonlinear projection of multivariate data." In [Proceedings 1992] IJCNN International Joint Conference on Neural Networks, vol. 3, pp. 335-340. IEEE, 1992.

Jamroz, Dariusz, and Tomasz Niedoba. "Comparison of selected methods of multi-parameter data visualization used for classification of coals." Physicochemical Problems of Mineral Processing 51 (2015).

Jouppi, Norman P., Cliff Young, Nishant Patil, David Patterson, Gaurav Agrawal, Raminder Bajwa, Sarah Bates et al. "In-datacenter performance analysis of a tensor processing unit." In Proceedings of the 44th Annual International Symposium on Computer Architecture, pp. 1-12. 2017.

Kumar, R. R., Vincenzo Randazzo, G. Cirincione, Maurizio Cirrincione, and Eros Pasero. "Analysis of stator faults in induction machines using growing curvilinear component analysis." In 2017 20th International Conference on Electrical Machines and Systems (ICEMS), pp. 1-6. IEEE, 2017.

Loverich, John. "Discontinuous Piecewise Polynomial Neural Networks." arXiv preprint arXiv:1505.04211 (2015).

Muthuramalingam, A., S. Himavathi, and E. Srinivasan. "Neural network implementation using FPGA: issues and application." International journal of information technology 4, No. 2 (2008): 86-92.

Piazza, F., A. Uncini, and M. Zenobi. "Neural networks with digital LUT activation functions." In Proceedings of 1993 International Conference on Neural Networks (IJCNN-93-Nagoya, Japan), vol. 2, pp. 1401-1404. IEEE, 1993.

Romero-Aragon, Jorge C., Edgar N. Sanchez, and Alma Y. Alanis. "Fpga neural identifier for insulin-glucose dynamics." In 2014 World Automation Congress (WAC), pp. 675-680. IEEE, 2014.

Sammon, John W. "A nonlinear mapping for data structure analysis." IEEE Transactions on computers 100, No. 5 (1969): 401-409.

Tommiska, M. T. "Efficient digital implementation of the sigmoid function for reprogrammable logic." IEE Proceedings—Computers and Digital Techniques 150, No. 6 (2003): 403-411.

Uncini, Aurelio, and Francesco Piazza. "Blind signal processing by complex domain adaptive spline neural networks." IEEE transactions on neural networks 14, No. 2 (2003): 399-412.

Yu, Chien-Cheng, Yun-Ching Tang, and Bin-Da Liu. "An adaptive activation function for multilayer feedforward neural networks." In 2002 IEEE Region 10 Conference on Computers, Communications, Control and Power Engineering. TENCOM'02. Proceedings., vol. 1, pp. 645-650. IEEE, 2002.

Zhang, Yuting, Kibok Lee, and Honglak Lee. "Augmenting supervised neural networks with unsupervised objectives for large-scale image classification." In International conference on machine learning, pp. 612-621. 2016.

\* cited by examiner

ARTIFICIAL NEURAL NETWORK IMPLEMENTATIONS

BACKGROUND

This application is related to implementations of artificial neural networks.

Artificial neural networks (ANNs) have become a primary form of machine learning. In particular, deep neural networks (DNN) have been shown to be very effective, particularly in tasks with large amounts of training data. These networks may have five or more layers implementing non-linear transformations in a feedforward configuration, and hundreds or thousands nodes processing separate scalar values per hidden layer in a fully-connected feedforward configuration. Other network architectures, for example, convolutional neural networks (CNN) may have similarly large numbers of connections. Therefore, one evaluation of a network may entail $10^7$ to $10^{10}$ multiplications. To make runtime implementations practical, parallel hardware platforms, such as GPUs using a CUDA programming model, are often used.

In some conventional neural network systems, non-linear behavior is implemented by applying an activation function (such as a "Rectifier Linear Unit" (ReLU) function) to an output of a node that sums weighted values (i.e., values multiplied or scaled by constant weights) of upstream nodes feeding into the node. In typical neural networks, the runtime computational complexity grows with the number of trainable parameters.

SUMMARY

The present disclosure is directed to neural networks with increased representation powers (i.e., increased parametrization, providing a large number of free parameters) that can be incorporated into various applications requiring accurate real-time computations (such as for adaptively computing coefficients for a digital predistortion (DPD) system). The neural networks of the present disclosure may be realized using piecewise linear functions for at least some of the edges (also referred to as links or synapses) connecting nodes of different layers. Such piecewise linear functions achieve a wide range of non-linear behavior (as compared to conventional artificial neural networks), while also reducing the number of nodes (but not the representation power), and complexity of neural networks by foregoing the use of separate activation functions (such as ReLU) to achieve non-linear behavior. In some examples, other types of non-linear functions may be realized for the edges (links). However, piecewise linear functions offer the further advantage that they can be implemented efficiently in hardware and/or software (e.g., via table-based implementation to efficiently store representations of piecewise linear functions and/or through software library definitions of piecewise linear functions).

A key concept described herein is the replacement of linear links/synapses between neural network (NN) layers by piecewise linear functions. Using piecewise linear functions increases the "representation power" of a neural network (or NN) without changing its layout. In principle, increasing the representation power can lead to higher accuracy, which is corroborated by experimentations performed on the implemented neural networks described herein.

Embodiments described herein improve the trade-off between accuracy, throughput, and power consumption for NNs. The choice of piecewise parametric functions (e.g., piecewise linear, piecewise polynomial, splines, etc.) is central to this improvement, since these functions can be implemented efficiently in hardware and/or software, which is not necessarily the case for general nonlinear functions.

Advantageously, the approaches described herein enhance operation of neural network applications that are otherwise limited by computational and power resources under existing technology. The fundamental nature of the approaches described herein can be broadly applied to neural network models both large and small. However, a significant potential benefit is achieved for applications that require real-time data processing without access to large data-centers and hardware resources, and with limited power supply. Example of such applications include various types of real-time digital processing for wireless applications, such as digital predistortion (DPD), crest factor reduction (CFR) applications, etc., image and audio data processing, beam-forming control applications, and so on.

There is a need to achieve, and even improve on, the performance of conventional ANNs and DNNs without incurring the substantial computational requirements seen today. In a general aspect, approaches described below provide a way to reduce the number of runtime multiplications per input without reducing the representational power of larger networks. These approaches make use of (1) implementation of piecewise linear functions on links between nodes of the ANN, and/or (2) use of an efficient table-based evaluation of the piecewise linear functions using precomputed tables. Piecewise linear functions are amenable to efficient training approaches, for example, based on back-propagation principles. In some implementations, other types of non-linear functions may be realized on the links between nodes of neural network layers.

Thus, in one aspect, in general, a machine-implemented artificial neural network is provided that includes a plurality of nodes, the nodes forming at plurality of layers including an input layer, at least one hidden layer, and an output layer, and a plurality of links, with each link coupling a corresponding source node and a receiving node of the plurality of nodes. At least one link of the plurality of links is configured to evaluate a piecewise linear function of a value provided by a first source node, from the plurality of nodes, to yield a value for a first receiving node coupled to the at least one link. Each node of a hidden layer is configured to aggregate values provided by links for which that node is the receiving node of the link, with the first receiving node providing non-linear output resulting, in part, from the at least one link, directed to the first receiving node, configured to evaluate the piecewise linear function.

Embodiments of the neural network may include at least some of the features described in the present disclosure, including one or more of the following features.

Multiple ones of the plurality of links may be configured to evaluate respective piecewise linear functions based on input values from respective source nodes coupled to the multiple ones of the plurality of links.

The respective piecewise linear functions may correspond to different piecewise linear functions.

The at least one link configured to evaluate the piecewise linear function may be configured to evaluate the piecewise linear function defined according to a plurality of adjustable coefficients defining respective linear sections of the piecewise linear function.

The adjustable coefficients may be retrieved from a table storing data for the plurality of sections of the piecewise linear function, with each linear section being represented based on breakpoints associated with the respective linear sections.

The adjustable coefficients may be computed according to training data used to minimize a loss measure between predictions made by the neural network and pre-labeled instances.

The piecewise linear function may be represented according to:

$$f(x; \vec{w}) = \begin{cases} \left(\frac{x - a_0}{a_1 - a_0}\right)w_1 + \left(\frac{a_1 - x}{a_1 - a_0}\right)w_0 & x < a_1 \\ \left(\frac{x - a_k}{a_{k+1} - a_k}\right)w_{k+1} + \left(\frac{a_{k+1} - x}{a_{k+1} - a_k}\right)w_k, & a_k \leq x \leq a_{k+1}, k = 1, \ldots, n-2 \\ \left(\frac{x - a_{n-1}}{a_n - a_{n-1}}\right)w_n + \left(\frac{a_n - x}{a_n - a_{n-1}}\right)w_{n-1} & x \geq a_{n-1} \end{cases}$$

where $a_0 < a_1 < \ldots < a_n$ are pre-determined n+1 ordered break points, and $w_k$, $0 \leq k \leq n+1$, are the corresponding adjustable coefficients.

The non-linear output of the first receiving node may be computed entirely based on the sum of the values produced by the links to the first receiving node without requiring an activation function applied to the computed sum of values at the first receiving node.

The at least one link of the plurality of links configured to evaluate the piecewise linear function may include a first set of intermediate links extending from the first source node into intermediate nodes located between a first layer comprising the first source node and a second layer comprising the first receiving node, and a second set of intermediate links extending from output of the intermediate nodes to the first receiving node, each of the multiple links and respective intermediate nodes realizing a respective basis function such that the composite of outputs directed from the intermediate nodes to the first receiving node through the second set of intermediate links realizes the piecewise linear function.

Each of the respective basis function may include a rectifier linear unit (ReLU) function.

The output layer may be configured to produce a plurality of time-varying gain components (g) in response to a plurality of phase-invariant derived signals (r) provided at the input layer, with each derived signal ($r_j$) of the plurality of derived signals being determined as a non-linear function of one or more transformed signals (w) derived from an input signal (u). A distortion term may be formed by accumulating a plurality of terms, each term being a product of a transformed signal of the one or more transformed signals (w) and a time-varying gain, the time-varying gain being a function of a one or more of the phase-invariant derived signals (r), the function of the one or more of the phase-invariant derived signals being decomposable into a combination of one or more parametric functions of a corresponding single one of the time-varying gain components ($g_i$), with the distortion term being combined with the input signal (u) to mitigate non linear distortions caused by an amplification system configured to process the input signal (u).

In some variations, a method is provided that includes receiving input values at input nodes of an input layer of a neural network comprising a plurality of nodes, at least some of the plurality of nodes further arranged in at least one hidden layer and an output layer. The method also includes computing for a receiving node, from the plurality of nodes, a resultant value according to functions realized by respective links coupling the receiving node to respective source nodes. Computing the resultant value for the receiving node includes evaluating, by at least one link of the respective links coupling the receiving node to the respective source nodes, a piecewise linear function implemented on the at least one link and applied to a first source node from the respective source nodes. The method further includes aggregating at the receiving node values provided by the respective links coupling the receiving node to the respective source nodes to provide a non-linear output resulting, in part, from the evaluated piecewise linear function applied to the first source node by the piecewise linear function implemented by the at least one link.

Embodiments of the method may include at least some of the features described in the present disclosure, including any of the features described above in relation to the neural network, and may further include one or more of the following features.

Computing the resultant value for the receiving node may include evaluating by multiple links of the respective links coupling the receiving node to the respective source nodes, piecewise linear functions implemented on the multiple links.

Evaluating the piecewise linear function may include evaluating the piecewise linear function according to a plurality of adjustable coefficients defining respective linear sections of the piecewise linear function.

The method may further include retrieving from a table storing data for the plurality of sections of the piecewise linear function, an adjustable coefficient and data for a particular linear segment of the piecewise linear function based on a value of the first node.

The method may further include deriving the adjustable coefficients according to training data used to minimize a loss measure between predictions made by the neural network and pre-labeled instances.

Evaluating the piecewise linear function may include evaluating the piecewise linear function according to:

$$f(x; \vec{w}) = \begin{cases} \left(\frac{x - a_0}{a_1 - a_0}\right)w_1 + \left(\frac{a_1 - x}{a_1 - a_0}\right)w_0 & x < a_1 \\ \left(\frac{x - a_k}{a_{k+1} - a_k}\right)w_{k+1} + \left(\frac{a_{k+1} - x}{a_{k+1} - a_k}\right)w_k, & a_k \leq x \leq a_{k+1}, k = 1, \ldots, n-2 \\ \left(\frac{x - a_{n-1}}{a_n - a_{n-1}}\right)w_n + \left(\frac{a_n - x}{a_n - a_{n-1}}\right)w_{n-1} & x \geq a_{n-1} \end{cases}$$

where $a_0 < a_1 < \ldots < a_n$ are pre-determined n+1 ordered break points, and $w_k$, $0 \leq k \leq n+1$, are the corresponding trainable coefficients.

The at least one link implementing the piecewise linear function may include a first set of intermediate links extending from the first source node into intermediate nodes located between a first layer comprising the first source node and a second layer comprising the receiving node, and a second set of intermediate links extending from output of the intermediate nodes to the receiving node, each of the multiple links and respective intermediate nodes realizing a respective basis function such that the composite of outputs directed from the intermediate nodes to the first receiving node through the second set of intermediate links realizes the piecewise linear function.

The method may further include generating, at the output layer a plurality of time-varying gain components (g) in response to a plurality of phase-invariant derived signals (r) received at the input nodes of the input layer, with each derived signal $(r_j)$ of the plurality of derived signals being determined as a non-linear function of one or more transformed signals (w) derived from an input signal (u). The method additionally includes forming a distortion term by accumulating a plurality of terms, each term being a product of a transformed signal of the one or more transformed signals (w) and a time-varying gain, the time-varying gain being a function of a one or more of the phase-invariant derived signals (r), the function of the one or more of the phase-invariant derived signals being decomposable into a combination of one or more parametric functions of a corresponding single one of the time-varying gain components $(g_i)$, and combining the distortion term with the input signal (u) to mitigate non-linear distortions caused by an amplification system configured to process the input signal (u).

In some variations, a design structure is provided that is encoded on a non-transitory machine-readable medium, with the design structure including elements that, when processed in a computer-aided design system, generate a machine-executable representation of a neural network that includes a receiving circuit to receiving input values at input nodes of an input layer of the neural network comprising a plurality of nodes, at least some of the plurality of nodes further arranged in at least one hidden layer and an output layer, a computing circuit to compute for a receiving node, from the plurality of nodes, a resultant value according to functions realized by respective links coupling the receiving node to respective source nodes, with computing the resultant value for the receiving node comprising evaluating, by at least one link of the respective links coupling the receiving node to the respective source nodes, a piecewise linear function implemented on the at least one link and applied to a first source node from the respective source nodes, and an aggregation circuit to aggregate at the receiving node values provided by the respective links coupling the receiving node to the respective source nodes to produce a non-linear output based, in part, on the evaluated piecewise linear function applied to the first source node by the piecewise linear function implemented by the at least one link.

In some variations, a neural network system is provided that is configured to perform one or more of the method steps provided above.

In some variations, an integrated circuit definition dataset that, when processed in an integrated circuit manufacturing system, configures the integrated circuit manufacturing system to manufacture one or more of the system modules described above.

In some variations, a non-transitory computer readable media is provided that is programmed with a set of computer instructions executable on a processor that, when executed, cause the operations comprising the various method steps described above.

Embodiments of the design structure, neural network system, the integrated circuit definition datasets, and the computer-readable media may include at least some of the features described in the present disclosure, including at least some of the features described above in relation to the neural network and the method.

Other features and advantages of the invention are apparent from the following description, and from the claims.

BRIEF DESCRIPTION OF THE DRAWINGS

These and other aspects will now be described in detail with reference to the following drawings.

Like reference symbols in the various drawings indicate like elements.

DESCRIPTION

Neural Network Implementation

Figure 1:
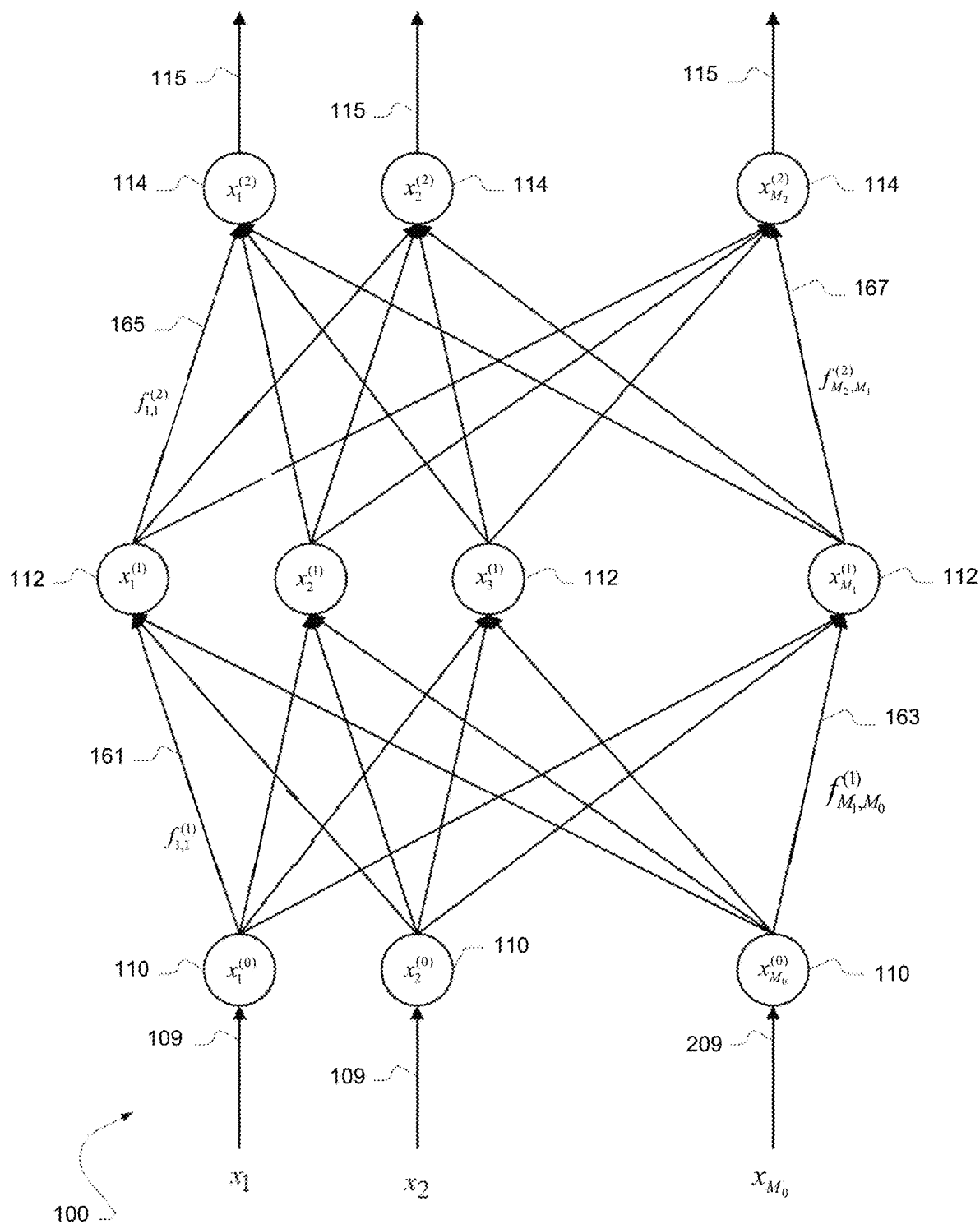
FIG. 1 is a diagram of a neural network implementation with one or more links realizing piecewise linear functions.

With reference to FIG. 1, an artificial neural network (ANN) 100 is parametrized through the use of piecewise linear function realized on the links (also referred to as the synapses or edges) between nodes of different layers. The piecewise linear functions defined on the links generally include multiple break points (i.e., the piecewise linear function will have more than two intervals, with the number of intervals, in some cases, being equal to $2^r$, where r is an integer larger than 1). A receiving node in the example neural network 100 receives at least one (and generally multiple) separate links, each of which may be realized as a distinct piecewise linear function, connecting the receiving node to input values provided to the links (such input values may be provided by nodes of a previous, upstream, neural network layer). The receiving node in this embodiment does not apply any non-linear function to the sum, although in alternative fixed or parametric non-linearities may be further introduced at the nodes in addition to the links. Furthermore, the sum may also include a fixed or parameterized bias input that is added to the sum from the previous nodes.

In the example implementations described herein, performing non-linear operations at the links between one layer of nodes ($M_n$ nodes for layer n) $M_n$ and another layer of nodes ($M_{n+1}$ nodes for layer n+1) can result in performing $M_n \cdot M_{n+1}$ (· signifying multiplication) multiplications and additions because once each input to a link is mapped to a particular linear interval, the remainder of the function of the link on other intervals does not result in further computation. Nevertheless, the number of free parameters characterizing the non-linear transformation between the two layers, assuming that there are d intervals per function may be $d \cdot M_n \cdot M_{n+1}$. It is not essential that the network be fully connected, and the ratio of free parameters and runtime multiply/adds nevertheless scales with d.

As will be discussed in greater detail below, the present neural network implementations, such as the neural network 100 of FIG. 1, in which the links/synapses themselves apply piecewise linear functions to inputs (received from a preceding neural network layer, or received as the raw input data to the neural network), can be used in applications that require and perform parametric nonlinear transformations from a set of variables (e.g., a real or complex valued vector) to another set of variables (i.e., application that require large adaptive transformations of inputs to outputs). An example where the neural networks described herein may be used is to perform digital predistortion in, for example, communication systems, where large stream of digital data is predistorted to mitigate non-linear effects caused by transmit chains comprising power amplifiers. Other applications in which large transformations of input data to output data are required may also rely on the improved neural network implementations described herein.

As illustrated in FIG. 1, the neural network implementations described herein are arranged according to a trainable configuration of interconnected nodes (neurons). The node configuration of the neural network 100 example shown in the figure includes three layers, namely, an input layer (layer 0), a single hidden layer (1), and an output layer (layer 2). The neural network 100 depicted in FIG. 1 has a feedforward structure with one input layer (composed of nodes 110 constituting layer 0), one hidden layer (composed of nodes 112 constituting layer 1), and one output layer (composed of nodes 114, constituting layer 2). Of course, neural networks may be constituted with any number of hidden layers, and may be composed of any number of nodes/neurons. In some examples, a neural network may have just a single layer of nodes. The nodes of the example neural networks described herein may be connected according to propagation structures other than a feedforward structure, and may include, for example, recurrent structures or other structures.

In general, each node receives one or more values (which may comprise real or complex values), and outputs a single value that is a function of its inputs. For example, the nodes 110 of the input layer receives input values over input links 109, and output them without modification. Each of the nodes 112 of the hidden layer (layer 1) receives a set of transformed values from the previous layer, computes a sum of this set of transformed values, and provides the sum as the output from the node. For example, the node for $x_1^{(1)}$ of the hidden layer 1 (that includes the nodes 112) sums the transformed outputs of the nodes 110 from layer 0 (the input layer). At least one of the links (received by the various nodes 112) realizes a non-linear function, such as a piecewise linear function, applied to the input provided by the nodes of the preceding layer.

As noted, by realizing piecewise linear functions directly on the links interconnecting the nodes, the parameterization (i.e., the representation power) of a neural network can be increased by increasing the number of segments of the piecewise linear functions of the links. Because a piecewise linear function achieves non-linear behavior, the use of such a piecewise linear function on at least one synapse/link connecting the set of upstream nodes to the destination/receiving node of the next layer avoids the need to separately apply a non-linear function to the summation performed by the destination node of the values computed through the links/synapses connected to the destination values. Moreover, because a piecewise linear function comprises multiple linear segments whose behavior (as defined by break points controlling the slopes and lengths of the segments), can be adjustably trained, the representation power of the neural network can be increased by a factor corresponding to the number of separate segments defining the piecewise linear function. In the present embodiment, the argument values at the breakpoints are fixed, and are preferably the same for the functions of all the links, and the value of the functions at those breakpoints are treated as the trainable parameters. For example, if, for a particular link, a piecewise linear function with d linear segments is implemented, there can be d+1 separate trainable parameters corresponding to the values of the function at the corresponding breakpoints (e.g., the height/y-axis values associated with the breakpoints of each segment) and the slopes on the segments for that link. In alternative examples, the breakpoints themselves may be trainable parameters, and different functions may have different breakpoints (e.g., all the functions on links leaving a particular node may have the same breakpoints, but functions on links leaving different nodes may have different breakpoints). The number of segments realized in a piecewise linear function can thus increase the representation power of a conventional neural network by a factor of d. Regardless of the number of segments, only one segment is used for any particular input. Thus, in examples of the neural networks described herein, at least one of the links between nodes (and in some cases multiple or even all the interconnecting links) is implemented to realize non-linear functions (at the links) instead of performing non-linear operations at the summation performed at the actual nodes or neurons. It is to be noted that some of the other links between the nodes can be realized using other functions types. For example, one or more links can implement weighted linear functions, or other types of non-linear functions.

The links between some of the nodes illustrated in FIG. 1 are shown as functions, $f$, parameterized based on input values from a preceding (upstream layer), and values defining the breaking points for the piecewise linear function (e.g., the horizontal-axis values, $a_n$, representing the starting positions of linear intervals/segments, and the corresponding vertical-axis values $w_n$). For example, the link 161 implements the non-linear function $f_{1,1}^{(1)}$ (which may be a piecewise linear function), $$f_{1,1}^{(1)}(x_1^{(0)}; \vec{w}_{1,1}^{(1)})$$

(the parenthesized terms for the various functions included in FIG. 1 are not shown). The notation $f_{j,i}^{(n)}$ indicates that the function of the link interconnecting the receiving node j=1 of layer n=1 with node i=1 of the preceding layer 110 (layer 0) is evaluated based on the particular value of the input provide by node i=1 of layer n=0 (e.g., this selects the particular piecewise linear segment when $f_{1,1}$ is a piecewise linear function). Selection of the particular linear segment for the piecewise linear function associated with the particular link will thus determine the particular breakpoints for the selected segment (e.g., for an argument value between $a_k$ and $a_{k+1}$), and the corresponding vertical-axis values (e.g., function values at the respective breakpoint, $w_k$ and $w_{k+1}$), which are represented in the vector (array) $\vec{w}$ associated with the link The values of $\vec{w}$ are adjustable, trainable, coefficients that control the behavior of the neural network 100. Similarly, the function of the link 167 between the receiving node $M_2$ of layer 2, and the node $M_1$ of layer 1 can be represented as:

$f_{M_2,M_1}^{(2)}(x_{M_1}^{(1)}; \vec{w}_{M_2,M_1}^{(2)})$.

Similar representations of the functions on the links 163 and 165 is provided. For the sake of clarity (so as to not clutter FIG. 1), only some of the links, particularly the links marked 161, 163, 165, and 167 are shown with their associated functions, $f$. However, any of the other interconnecting links feeding into any of the nodes may be associated with functions parameterized with the input values from the preceding layer and adjustable coefficients represented by the vector $\vec{w}$. Thus, in the neural network configuration of FIG. 1, at least one of the links/synapses (and possible multiple, or even all of the links) connecting inputs to a node of a particular layer, implement a non-linear function (in example embodiments, such a non-linear function, $f$, is a piecewise linear function, but may be a piecewise constant function, or some other type of non-linear function) that is parameterized by the particular value, x, of the input (which determines the segment of the piecewise linear function that becomes active), and, for example, the vertical-axis values (or height), w, corresponding to breakpoints at that segment (i.e., for as piecewise linear function with d segments, there are generally at least d separate and independent trainable coefficients w). Because the use of a piecewise linear function on at least one of the links introduces non-linear behavior to the output of the receiving nodes, it is not necessary to separately apply an activation function to the output of the receiving nodes (although, in some embodiments, an activation function, such as an ReLU, can be applied to the output of at least some of the nodes, even when at least one of the links already introduces non-linearity through implementation of a piecewise linear function).

Figure 2:
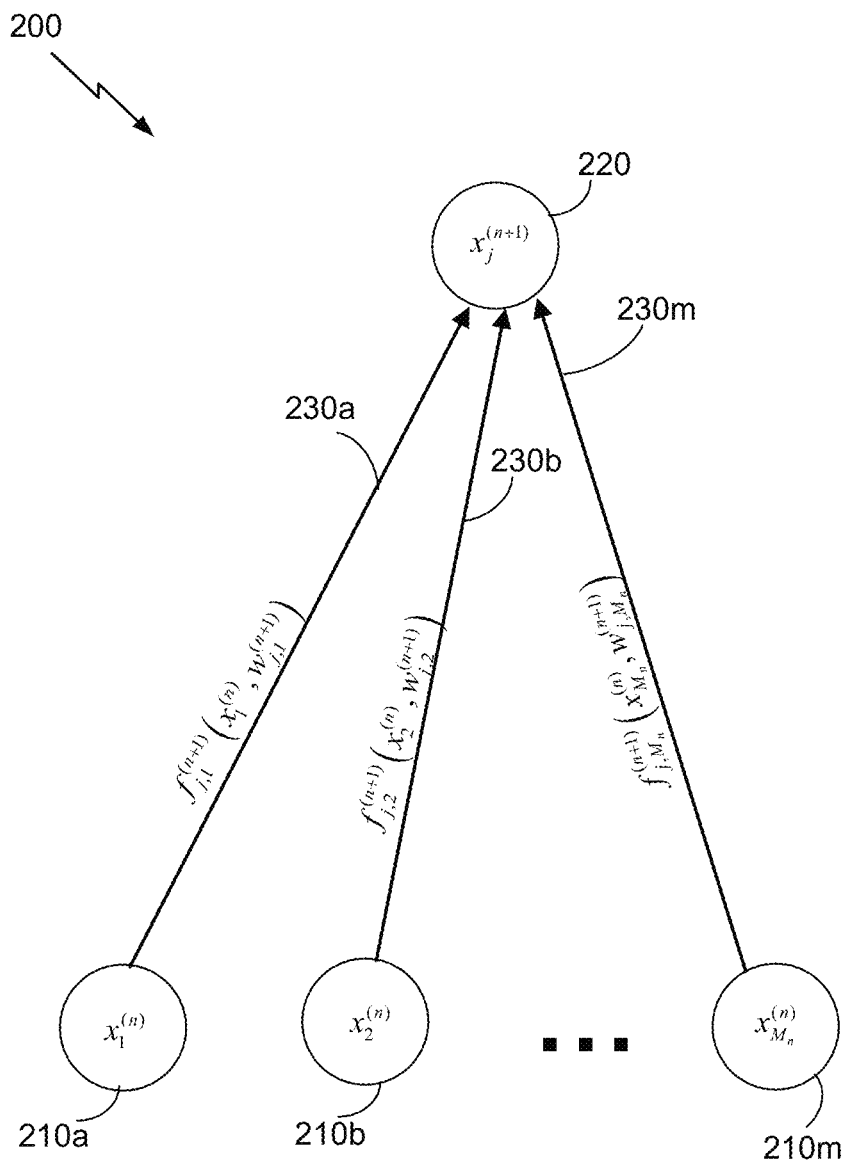
FIG. 2 is a diagram of a cluster of nodes of a portion of an example neural network.

FIG. 2 is a diagram of a portion of a neural network (such as the neural network 100) showing a cluster of nodes 200 comprising sources nodes 210a-m, and a receiving node 220. A neural network typically includes multiple such clusters as the cluster 200. The source nodes 210a-m of the cluster 200 are interconnected to the receiving node 220 via links 230a-m, with the links 230a-m realizing piecewise linear functions $f$. The receiving (destination) node 220 performs a summation operation on the values outputted by the links, and thus, in the example of FIG. 2, the node 220 (which is the $j^{th}$ node of layer n) sums (aggregates by addition) the i values produced by the $M_n$ piecewise linear functions performed by the links. The sum of values produced by the links in which at least one of the links is a non-linear function produces a non-linear value at the receiving node 220, and thus no additional non-linear operation needs to be performed (although optionally a further non-linear operation may be performed). Although in the example of FIG. 2 all the links 230a-n are shown as realizing piecewise linear functions, in other examples, only one such link may be implemented as a non-linear function (e.g., piecewise linear function), and in yet other examples, none of the links needs to realize a non-linear function (as long as some other cluster of nodes in the parent neural network includes at least one link implementing a non-linear function such as a piecewise linear function). In some examples, other types of non-linear functions may be realized for one or more of the links, including piecewise constant functions, piecewise polygonal functions, etc.

As discussed with respect to the links illustrated in FIG. 1, each of the links 230a-m of the cluster 200 has a corresponding argument value, x, of the source node connected to it (which determines the segment of the piecewise linear function that becomes active), and adjustable coefficients defining the piecewise linear functions, e.g., the values w corresponding to the y-axis (height) of the selected linear segment. For as piecewise linear function with d segments, there can be at least d+1 separate and independent trainable coefficients w.

Figure 3A:
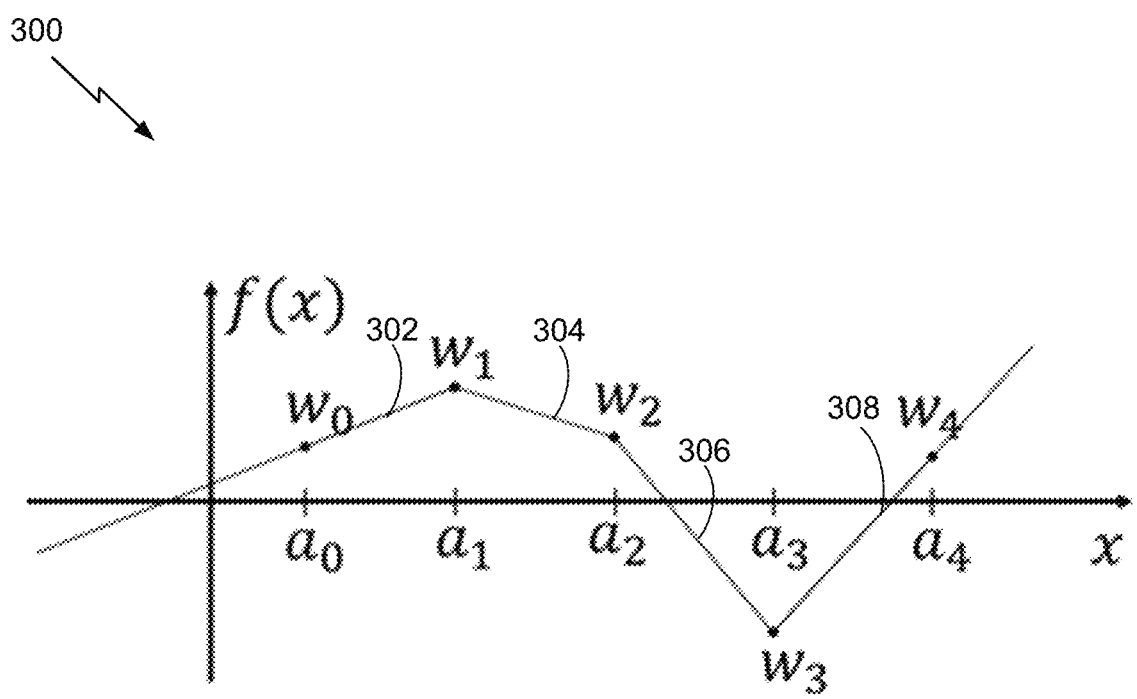
FIG. 3A is a graph showing a representation of an example piecewise linear function that includes four (4) segments.

An example of a piecewise linear function which may be used for one or more of the links of the neural networks described herein is defined to form d d piecewise linear sections as follows:

$$f(x; \vec{w}) = \begin{cases} \left(\frac{x-a_0}{a_1-a_0}\right)w_1 + \left(\frac{a_1-x}{a_1-a_0}\right)w_0 & x \leq a_1 \\ \left(\frac{x-a_k}{a_{k+1}-a_k}\right)w_{k+1} + \left(\frac{a_{k+1}-x}{a_{k+1}-a_k}\right)w_k, & a_k < x \leq a_{k+1}, k=1,\ldots,d-2 \\ \left(\frac{x-a_{n-1}}{a_n-a_{n-1}}\right)w_n + \left(\frac{a_n-x}{a_n-a_{n-1}}\right)w_{n-1} & x \geq a_{d-1} \end{cases}$$

where $a_0 < a_1 < \ldots < a_d$ are pre-determined n+1 ordered break points, and $w_k$, $0 \leq k \leq d$, are corresponding d+1 trainable coefficients (i.e., trainable vertical-axis, or height, values). (Note that the function is extrapolated to values below $a_0$ and to values above $a_d$, so although there are d+1 values, there are d linear segments over the entire domain of the function.) In some embodiments, the above definition of the piecewise linear function can be represented with $a_0=0$, yielding d trainable parameters per function and with a single bias term added to each sum for the outputs of the non-linear functions, adding $M_n$ bias terms for the next layers, with those bias terms being constant (e.g., 1.0) or also trained. As noted, every piecewise linear function is associated with a respective coefficient vector, $\vec{w}$, that maintains respective adaptable coefficients for each of the linear segments of the piecewise linear function. FIG. 3A is a graph 300 showing a representation of an example piecewise linear function that includes four (4) segments/intervals, defined through five breakpoints. The intervals of FIG. 3A include interval 302 from $a_0$ to $a_1$ and extending to arguments less that $a_0$, interval 304 from $a_1$ to $a_2$, interval 306 from $a_2$ to $a_3$, and interval 308 from $a_3$ to $a_4$. The values $w_4$ shown in FIG. 3A are the function's values evaluated at the break points, based on which the line equations for the different line segments/intervals can be derived. Although the example piecewise linear function of FIG. 3A is shown to be continuous, the linear functions do not necessarily need to be continuous. In some implementations, the defined piecewise linear functions implemented at a neural network's links can be controlled to conform to various constraints. Specifically, in some implementations, piecewise linear functions may meet the following constraints:

The number of intervals in the piecewise linear function is a power of 2 ($d=2^r$ for some positive integer r);
A particular, for example the leftmost, break point in the piecewise linear function lies at a fixed value, for example, zero (e.g., $a_0=0.0$), or at a minimum argument value, and/or the rightmost break point in the piecewise linear function lies at one ($a_n=1$);
The break points in the piecewise linear function are equally spaced ($a_k - a_{k-1} = 1/n$, for $1 \leq k \leq d$); and
The coefficient of the particular break point in the piecewise linear function is zero (e.g., $w_0 = f(a_0) = 0.0$).

Another way of representing piecewise linear functions is based on a sum of kernel functions, according to:

$$f(x) = b + \sum_{s=1}^{d} a_s \phi(x - a_s),$$

with breakpoints at the x=$a_s$ points. Thus, for a specific piecewise linear function (one of a plurality of functions that can be identified by a source node j and a destination (receiving) node k at a layer n) the representation becomes:

$$f_{j,k}^{(n)}(x) = b_{j,k}^{(n)} + \sum_{s=1}^{d} a_{j,s,k}^{(n)} \phi(x_j^{(n-1)} - a_s).$$

Examples of such kernel functions include:

$$\phi(x) = \begin{cases} 1-x & \text{when } x \geq 0 \\ x-1 & \text{when } x < 0 \end{cases}, \text{ or}$$

$$\phi(x) = \begin{cases} 1-x & \text{when } 0 \leq x < 1 \\ x-1 & \text{when } -1 < x < 0, \text{ or} \\ 0 & \text{otherwise} \end{cases}$$

$$\phi(x) = \begin{cases} x & \text{when } x \geq 0 \\ 0 & \text{when } x < 0 \end{cases}.$$

Figure 3B:
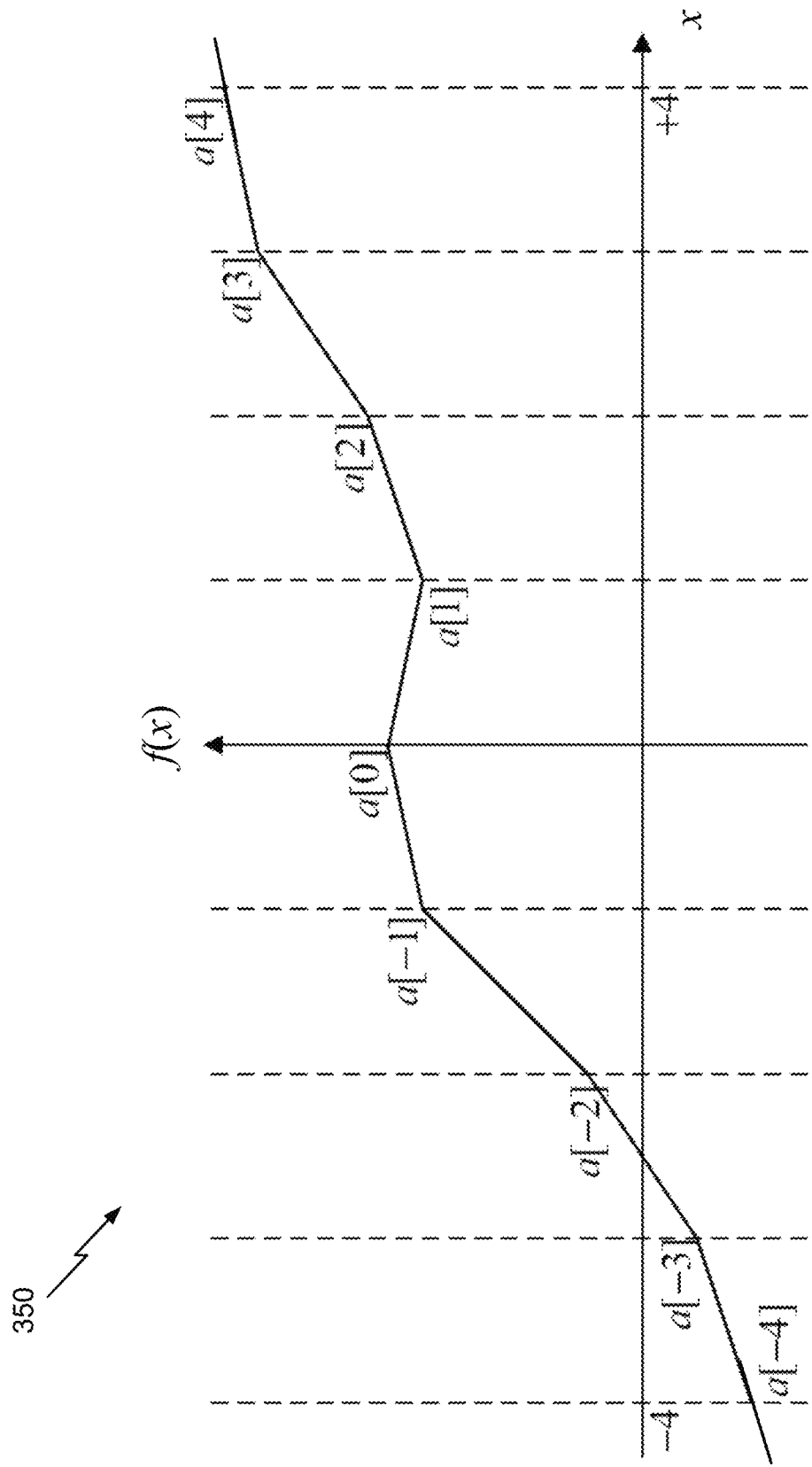
FIG. 3B is a graph of another example piecewise linear function.

FIG. 3B is a graph of another example of a piecewise linear function 350. The segments (intervals) of the example piecewise linear function 450 can be represented as:

$$f(x) = a[p(x)] + b[p(x)]q(x),$$

where a[ ] and b[ ] are arrays of coefficients.

In the above representation, x is the input values provided to the piecewise linear function, p(x) is a quantization of the input x, and q(x) is a fractional component of the input y. In the example graphical representation of FIG. 3B, the breakpoints are at integer values of x and p(x) returns the floor of x (i.e., greatest integer not greater than y) and q(x) returns the fractional part of x, when $-2^k \leq x \leq 2^k$. In this example too, the piecewise linear function, $f(x)$ is shown to be a continuous function. However, such continuity is not required. As will be discussed below in greater detail, the piecewise linear function representation in the example of FIG. 3B (and also 3A) is conducive to table-based implementations to manage the coefficients representing the piecewise linear functions. In this representation, more generally when the breakpoints are not at integer points, p(x) is the segment index on which x falls, and one can define q(x)=x for with b[ ] being the slope of the segment, and a[ ] being suitably chosen to match the breakpoints of the segment.

The values of the trainable coefficients (including the weights of weight vectors associated with any piecewise linear function realized on any of the neural network's links) may be obtained using similar techniques to those applied to train standard neural networks, e.g., adjusting coefficients defining the functions realized at the links based on output produced by an output stage of the neural network in response to the training data, for example using a gradient-based procedure such as back-propagation. For example, a common technique is to minimize a loss measure (e.g., categorical cross-entropy) between predictions made by the neural network model and pre-labeled instances using stochastic gradient descent (or similar methods). Gradients needed by the minimization procedures can be computed using backward propagation.

Figure 4:
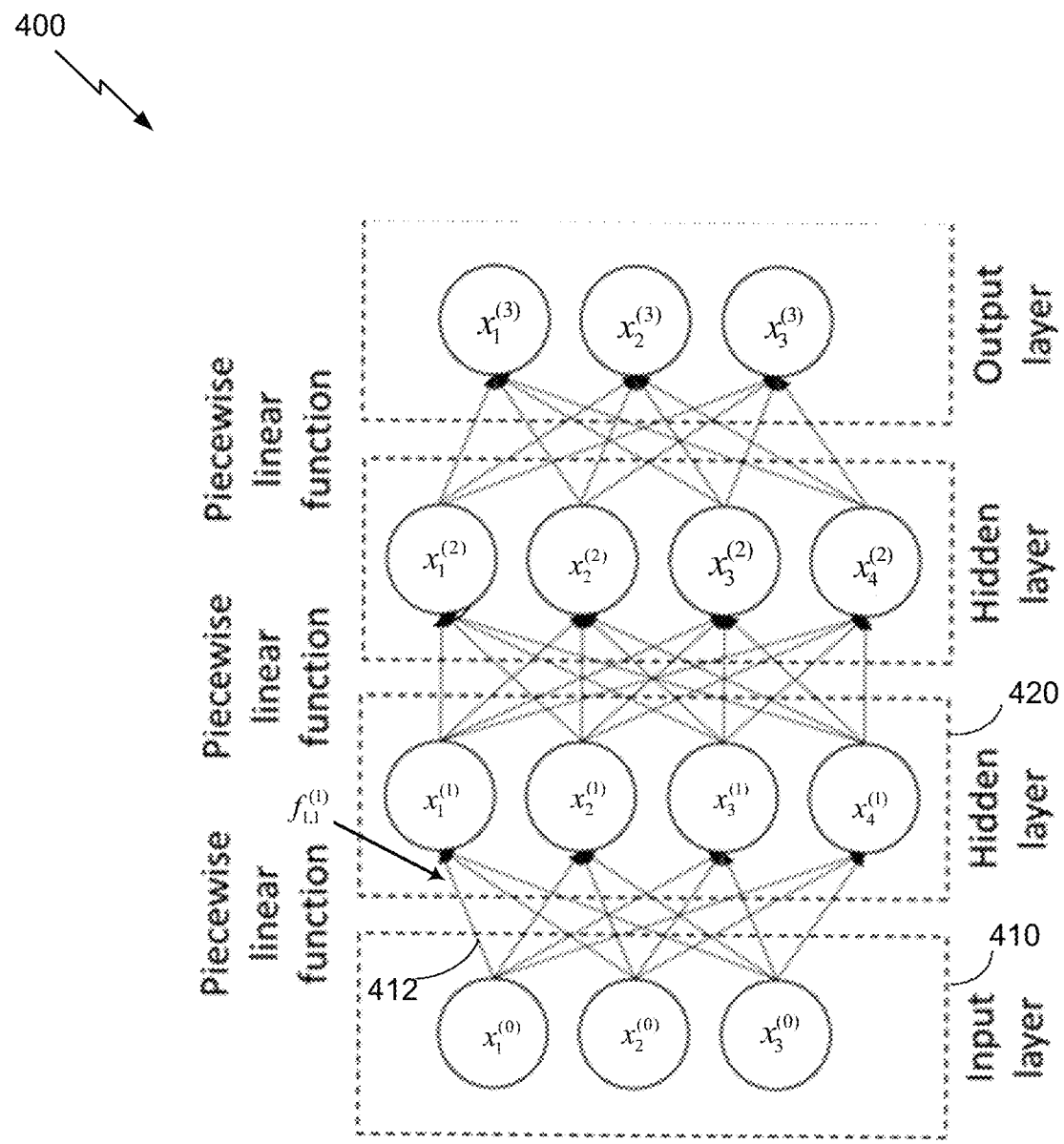
FIG. 4 is a diagram of another example neural network.
Figure 5:
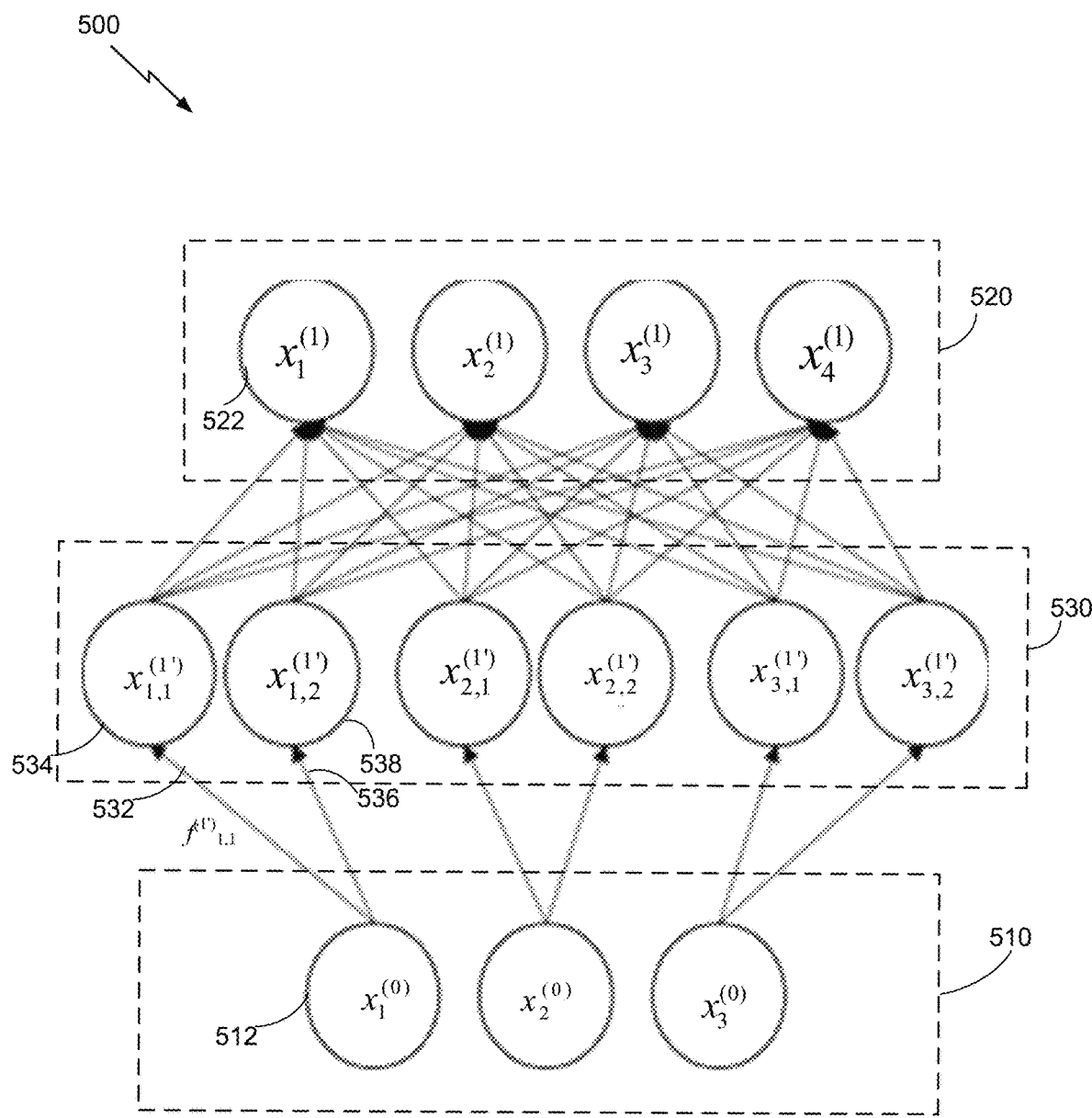
FIG. 5 is diagram of an alternative implementation of example neural network of FIG. 4.

In some examples, piecewise linear functions realized on the links may be implemented based on an alternate mathematical representation in which a particular piecewise linear function is described as a linear composition of basis functions, one for each break point (n basis functions). This representation can be implemented in TensorFlow by introducing an intermediate neural network layer. To illustrate, consider first, with reference to FIG. 4, another example neural network 400, which may have been implemented in a manner similar to that of the neural network 100, except that for the neural network 400 all the interconnecting links between nodes implement piecewise linear functions. Thus, for example, in the neural network 400, the nodes $x_1^{(0)}$-$x_3^{(0)}$ of the input layer 410 (i.e., layer 0) are interconnected to the nodes $x_1^{(1)}$-$x_4^{(1)}$ of the hidden layer 420 via links (such as 412) that each realize a piecewise linear function (e.g., the link 412, interconnecting the nodes $x_1^{(0)}$ to $x_1^{(1)}$, realizes the piecewise linear function $f_{1,1}^{(1)}$). For the sake of illustration assume that each piecewise linear function includes two segments. FIG. 5 shows an alternative implementation 500 of the example neural network 400. In FIG. 5, the layer 510 is similar to the layer 410 of the neural network 400, and the layer 520 is similar to the layer 420. However, in contrast to the neural network 400, the alternate implementation 500 includes an intermediate layer of nodes 530 interposed between the layer 510 and the layer 520. The number of nodes of the intermediate layer is the number of nodes of the preceding layer times the number of basis functions (n). Because the piecewise linear functions realized at the links of the neural network 400 are defined as two (2) segment linear functions, in the alternate implementation 500 each of the nodes of the first layer 510 is connected to two dedicated nodes in the intermediate layer 530, in order to implement piecewise linear function with two break points. If the piecewise linear function to be implemented was to have four segments, each node in the layer 510 would need to be connected to a set of four dedicated intermediate node. Thus, in the example of FIG. 5, the node 512 in the layer 510 (marked as $x_1^{(0)}$, identifying the node as node 1 of input layer 0) is connected to two dedicated intermediate nodes 534 and 538 (marked as $x_{1,1}^{(1')}$ and $x_{1,2}^{(1')}$, where the superscript 1' identifies the intermediate layer number (in this case, 1' indicates an intermediate layer preceding layer 1), via respective links 532 and 536. Each of those links realizes a basis function, with the composite of the two basis functions achieving the desired piecewise linear function. For example, the basis functions at the links directed to the intermediate nodes can take the form of:

$$f_{i,j}^{(n)}(x_i^{(n)}) = \max(0, x_i^{(n)} - j/k).$$

The subscript i represents the source node, n represents the layer level of the source node feeding into intermediate node, and j represents the identity of one of the k's intermediate nodes dedicated to each source node. For example, the node 538 is annotated as $x_{1,2}^{(1')}$ to identify it as the second intermediate node (out of two) assigned to the source node $x_1^{(0)}$. In the example of FIG. 5, the basis functions for the links 532 and 536 (feeding into the intermediate nodes 534 and 538, respectively) are marked as $f_{1,1}^{(1')}$ and $f_{1,2}^{(1')}$, identifying the former function as the function realized on the link between source node 1 of layer 0 and the first associated dedicated node in the intermediate node, and identifying the latter function as the function realized between source node 1 of layer 0 and the second associated dedicated node in the intermediate node.

The nodes at the layer 520 receive links from each of the dedicated nodes of the intermediate layer 1'. Thus, instead of implementing a direct link from one node (e.g., a link from node 512 of the layer 510 to a node 522 of the layer 520, such a direct link can instead be implemented as a composite (optionally weighted) of two links (in the above example) feeding into the particular node in the layer 520 (e.g., the node 522) from the two intermediate nodes assigned to the source node (e.g., the nodes 534 and 538 of the intermediate layer 530). Other types of basis functions may be used to realize the desired piecewise linear function behavior.

Although the above alternative approach for realizing piecewise linear function behavior adds computational overhead when compared with a direct piecewise linear function implementation, because it can use rectifier linear unit (ReLU) functions as basis functions to compose the desired piecewise linear function, this representation can be implemented with existing software libraries.

The neural networks described herein may be realized using different types of neural network architectures, configuration, and/or implementation approaches. Examples neural networks that may be used include convolutional neural network (CNN), feed-forward neural networks, recurrent neural networks (RNN), etc. Feed-forward networks include one or more layers of nodes ("neurons" or "learning elements") with connections to one or more portions of the input data. In a feedforward network, the connectivity of the inputs and layers of nodes is such that input data and intermediate data propagate in a forward direction towards the network's output. There are typically no feedback loops or cycles in the configuration/structure of the feed-forward network. Convolutional layers allow a network to efficiently learn features by applying the same learned transformation (s) to subsections of the data.

The neural networks can be implemented on any computing platform, including computing platforms that include one or more microprocessors, microcontrollers, and/or digital signal processors that provide processing functionality, as well as other computation and control functionality. The computing platform can include one or more CPU's, one or more graphics processing units (GPU's, such as NVIDIA GPU's), and may also include special purpose logic circuitry, e.g., an FPGA (field programmable gate array), an ASIC (application-specific integrated circuit), a DSP processor, an accelerated processing unit (APU), an application processor, customized dedicated circuitry, etc., to implement, at least in part, the processes and functionality for the neural network, processes, and methods described herein. The computing platforms used to implement the neural networks typically also include memory for storing data and software instructions for executing programmed functionality within the device. Generally speaking, a computer accessible storage medium may include any non-transitory storage media accessible by a computer during use to provide instructions and/or data to the computer. For example, a computer accessible storage medium may include storage media such as magnetic or optical disks and semiconductor (solid-state) memories, DRAM, SRAM, etc.

The various learning processes implemented through use of the neural networks described herein may be configured or programmed using TensorFlow (an open-source software library used for machine learning applications such as neural networks). Other programming platforms that can be employed include keras (an open-source neural network library) building blocks, NumPy (an open-source programming library useful for realizing modules to process arrays) building blocks, etc. In examples using the TensorFlow platform, configuring the neural networks to include piecewise linear functions on the links between nodes can be achieved in several distinct forms, that include, for example: 1) alternate mathematical representations (as illustrated and discussed, for example, in relation to FIG. 5), 2) CUDA C implementation of piecewise linear function (primarily for GPU-based hardware), or C/C++ implementation of piecewise linear function (primarily for CPU-based hardware).

For example, consider a first implementation approach that is based on GPU-hardware platforms to implement neural network layers (e.g., fully connected and convolutional). In that approach, the layers are implemented as customized operations using the CUDA C language and compiled as static libraries callable by the TensorFlow platform. A second possible implementation approach is based on C/C++ implementation of piecewise linear link function. Layers of the neural network can be implemented as customized operations using C and C++ language, and compiled as static libraries callable by the TensorFlow platform. This implementation approach allows the customized operation to be executed on CPU hardware. Other implementation approaches for realizing neural networks that include at least one link configured as a piecewise linear function are also possible.

Table-Based Implementation Approach

A further approach for implementing piecewise linear functions is based on the use of hardware- or software-based tables that include values of the parameters defining the various segments/intervals of the piecewise linear functions (e.g., the function values at the break points). As noted, the vertical axis values of the linear segments can be adjustable trainable values that can be trained based on training data, and may be also adapted during runtime based on changes to operating conditions, and/or in response to changes to the behavior of input data. To illustrate use of a table-based implementation, consider, with reference to FIG. 6, a diagram 600 of a table-based implementation to define a piecewise linear function such as the one illustrated in FIG. 3B (i.e., where the piecewise linear function may be defined according to the form $f(x)=a[p(x)]+b[p(x)]q(x)$). In this example, a table 620 stores values of a and b associated with different intervals of the example piecewise linear function. An input value x is first processed by in a decomposition circuit 610, which output $p(x)$ and $q(x)$. The value $p(x)$ is used as an index into the table 620 to retrieve the corresponding values of a and b, for example, in cells 621 and 622, respectively, of the table. The a[p] and KA values looked up in the table 620, as well as the fractional part q, may be provided to an interpolation circuit 630, which computes $f(x)=a[p]+b[p]q$ (which is the output value of the link).

Figure 6:
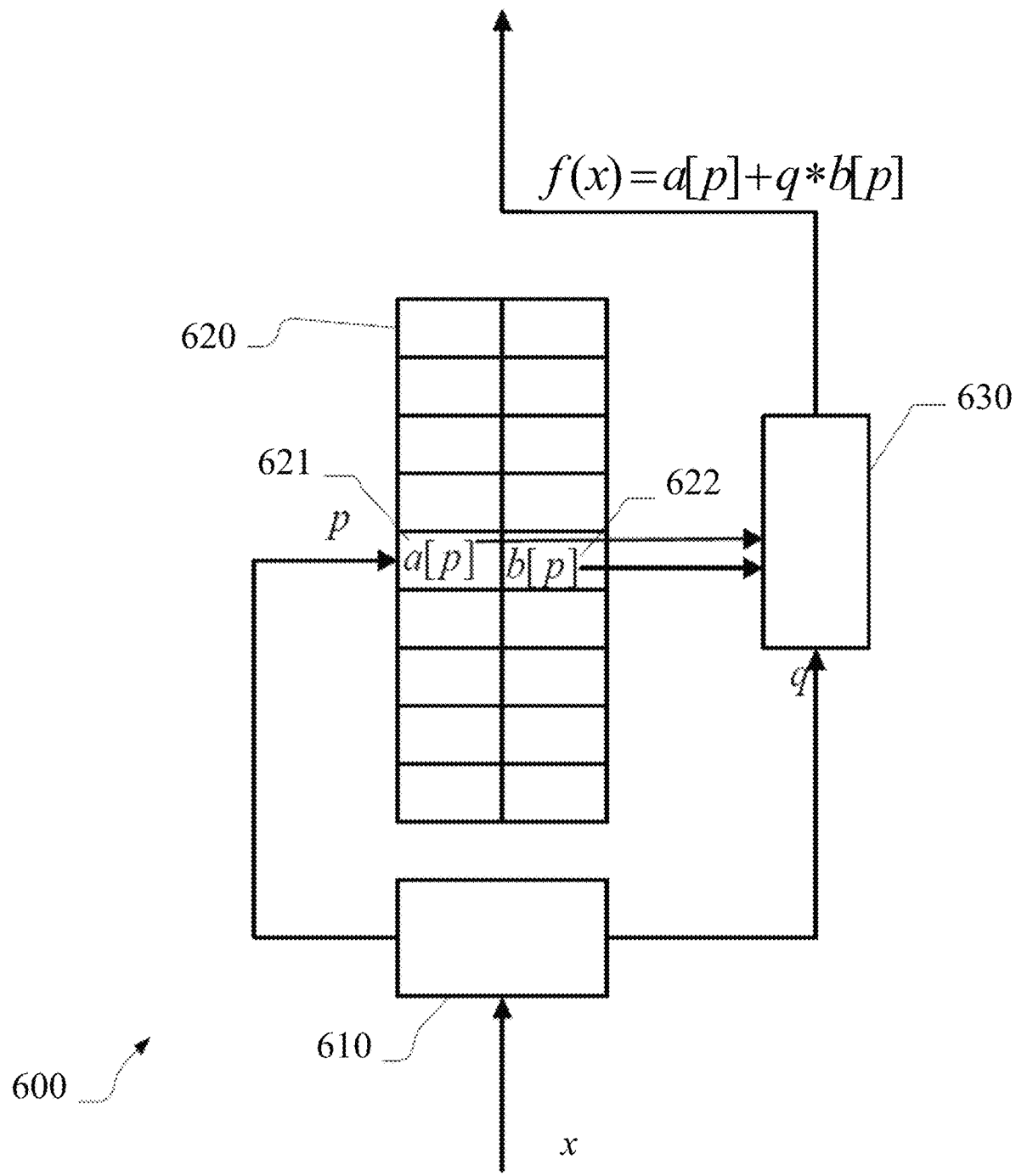
FIG. 6 is a diagram of a table-based implementation to define piecewise linear functions (such as the one illustrated in FIG. 7A).
Figure 7A:
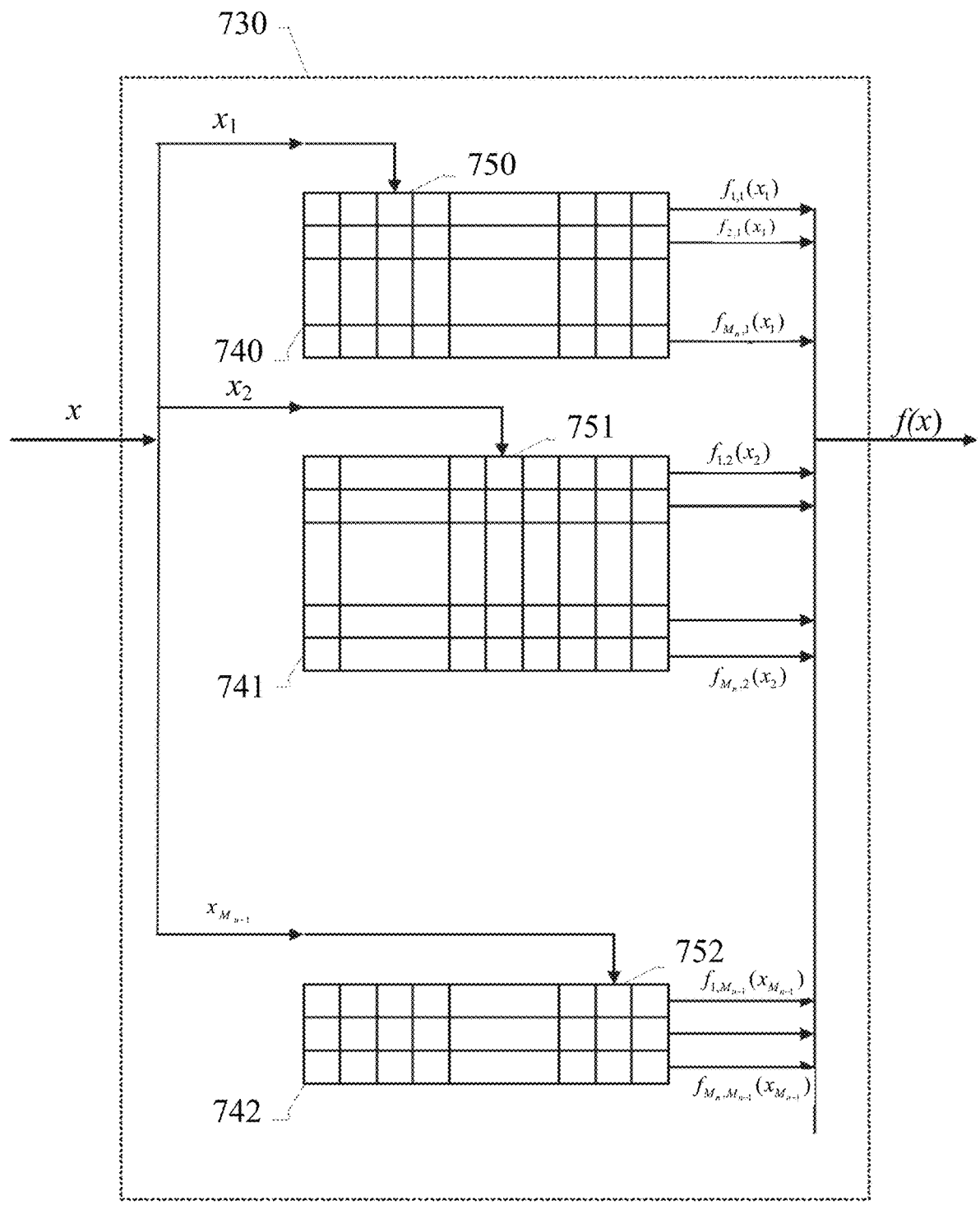
FIG. 7A is a diagram of another table-based implementation to store and access definitions of piecewise linear functions.
Figure 7B:
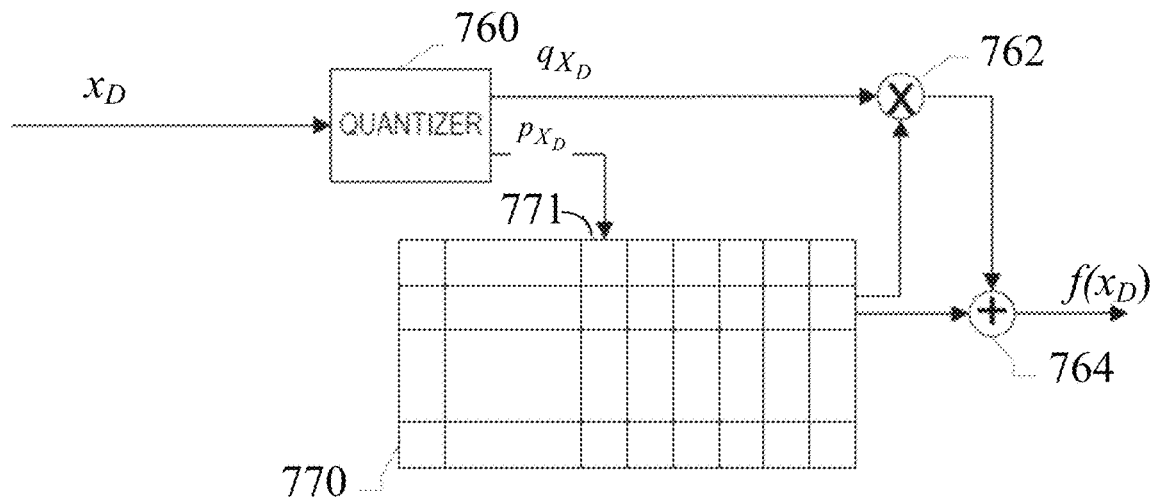
FIGS. 7B-C are diagram of additional examples of table-based implementations for storing and accessing definitions of neural network functions realized on links.
Figure 7C:
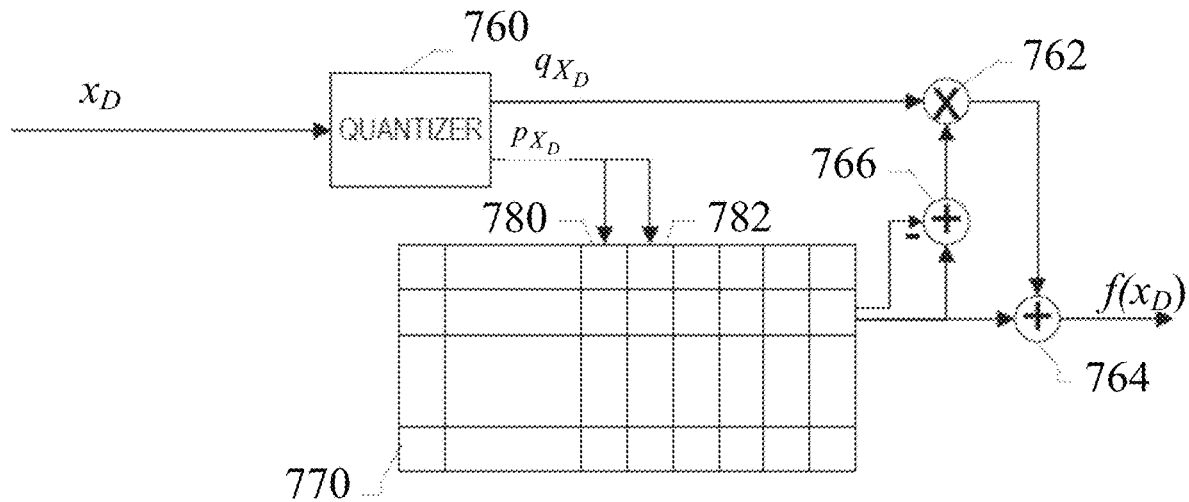

The implementation of FIG. 6 can be used to easily retrieve values from a look-up table for individual nodes in the neural networks described herein. FIGS. 7A-C are diagrams illustrating a table-based implementation used to compute function values (including piecewise linear function values) for a layer of nodes, where potentially every one of $M_{n-1}$ nodes in a particular layer (n−1) could have an output directed to $M_n$ links (i represents a particular node) that connect that node to multiple ones of nodes in a next (downstream) layer (layer n). Each of those links could potentially implement a piecewise linear functions, thus requiring careful management and access to a large number of parameters (stored in tables) to evaluate the different piecewise linear function that may be realized for $M_{n-1} \cdot M_n$ links (edges) between one layer and the next. The implementations of FIGS. 7A-C are similar to the table-based approaches described in U.S. patent application Ser. No. 16/656,686, entitled "Multi-Band Digital Compensator for a Non-Linear System," the content of which is herein incorporated by reference in its entirety. In that patent application, gain functions, ϕ(r), used to construct predistortion terms, were implemented as piecewise linear functions. Tables maintaining linear function definitions for multiple such gain functions would then be accessed according to values derived from input samples to the predistorter system. Similarly, in the present embodiments of the neural networks comprising piecewise linear functions for links of the neural networks, tables maintaining piecewise linear functions definitions are accessed in order to evaluate up top values (per node) for a given input into a node of the neural network.

A lookup table uses an input value $x_i^n$ (i.e., the value of $i^{th}$ node of layer n) as an index to access $p_i^n$ (i.e., the number for the node of layer n) entries of the lookup table with parameters representing piecewise (or other types of functions) associated with $i^{th}$ node of the layer n. Because each function of a link may be a piecewise linear function with d segments, the lookup table may have $$N_n \cdot \sum_i^{N_n} p_i^n d_i^n$$

table cells/entries for a layer n (denoted by the superscript) of the neural network. If each piecewise linear function is restricted to an argument range of [0,1], the range can be divided into $2^s$ sections or intervals, for example, $2^s$ equal sized sections with boundaries at $i2^{-s}$ for $i \in \{0,1,\ldots,2^s\}$. Thus, for a piecewise linear function, a table with $1+2^s$ values can represent the function, such that evaluating the function for a particular value of $x_i^n$ involves retrieving two values from the table for the boundaries of the section that $x_i^n$ is within, and appropriately linearly interpolating the retrieved values.

Referring to FIG. 7A, a diagram of an implementation of lookup table 730 used to access definitions of piecewise linear functions is shown. In this illustration, the lookup table 730 can be used to access function definitions for $M_n$ nodes of a neural network layer n (in FIG. 7A, the values of the nodes are represented as x, where x is a vector of values $x_1, \ldots, x_{M_{n-1}}$). The table 730 is arranged as a set of tables (or parts of one table) 740-742, which together constitute the table 730. The table 740, for example, has one row for each function, $f_{M_n,1}$, that is implemented or constituted for each link extending from the node 1 of the layer n-1 (the notation $M_n$ indicates that there are $M_n$ links, one for each of the nodes in the downstream layer n, extending from the node, identified by the second value of a pair of values (i,j) indicated in the subscript of the function $f$). As noted, the function, $f$, may be a piecewise linear function, but can be some other type of non-linear function, including, for example, piecewise constant function, or some other type of non-linear function. The table 741 has similarly one row for each function $f_{i,2}$, and so forth. That is, each row represents the endpoints of the linear segments of the piecewise linear form of the function. In such an arrangement, each of the tables 740-742 will in general have a different number of rows. Also, it should be understood that such an arrangement of separate tables is logical, and the implemented data structures may be different, for example, with a separate array of endpoint values for each function, not necessarily arranged in tables as shown in FIG. 7A. To implement the mapping from x to $f(x)$, each element of x (e.g., $x_1, \ldots,$ $x_{M_{n-1}}$ in the layer n-1) is used to select a corresponding column in the $j^{th}$ table, and the values in that column are retrieved to form a portion of $f(x)$. For example, the $x_1^{th}$ column 750 is selected for the first table 740, and the values in that column are retrieved as $f_{1,1}(x_1), \ldots, f_{M_n,1}(x_1)$. This process is repeated for the $x_2^{nd}$ column 751 of table 741, the column 752 of table 742 and so forth to determine all the component values of $f(x)$. In an embodiment in which piecewise linear functions are used, two columns may be retrieved, and the values in the columns may be linearly interpolated to form the corresponding section of $f(x)$. It should be understood that the table structure illustrated in FIG. 7A is only one example, and that other analogous data structures may be used within the general approach of using lookup tables rather than extensive use of arithmetic functions to evaluate the functions $f(x)$.

FIGS. 7B-C show additional example table-based implementations for storing and accessing definitions of neural network functions realized on links. The example implementations of FIGS. 7B-C rely on a quantizer as a way of accessing the tables. More particularly, a value $x_D$ is first processed in a quantizer 760, which determines which segment $x_D$ falls on, and outputs a value $p_{x_D}$ representing that segment. The quantizer also output a "fractional" part $q_{x_D}$, which represents the location of $x_D$ in the interval for that segment. Each cell in the column 771 identified by $p_{x_D}$ has two quantities, which essentially define one endpoint and the slope of the segment. The slope is multiplied in a multiplier 762 by the fractional part q and the product is added in an adder 764 to yield the value $f(x_D)$. Of course, this is only one implementation, and different arrangements of the values stored in the table 770, or in multiple tables, and the arrangement of the arithmetic operators on selected values from the table to yield the value of the function $f(x_D)$ may be used.

FIG. 7C shows another arrangement for use with piecewise linear functions. In this arrangement, the quantizer's output $p_{x_D}$ selects two adjacent columns of the table, which represent the two endpoint values. Such an arrangement reduces the storage by a factor of two as compared to the arrangement of FIG. 7B. However, because the slope of the linear segments are not stored, an adder 765 is used to take the difference between the endpoint values, and then this difference is multiplied by $q_{x_D}$ and added to one of the endpoint values in the manner of FIG. 7B.

DPD Application

Figure 8:
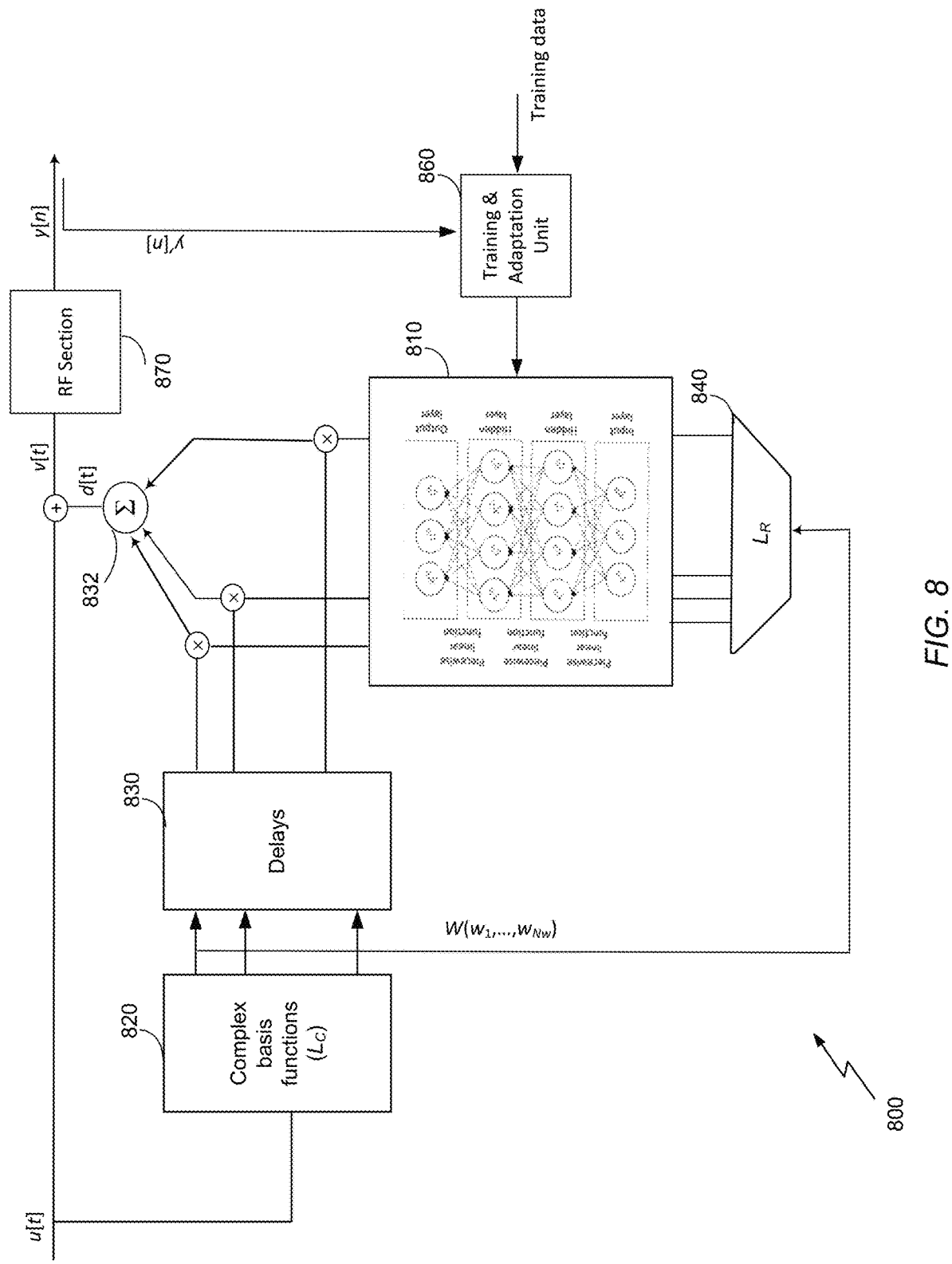
FIG. 8 is a schematic diagram of an example digital predistortion (DPD) system that incorporates a neural network 810 such as that depicted in FIG. 4.

As noted above, the improved neural network implementations described herein can be used in a myriad of different applications. An example of such an application is to use the improved neural network in digital predistortion (DPD) systems. FIG. 8 is a schematic diagram of an example DPD system 800 that incorporates a neural network 810 such as that depicted in FIG. 4. The neural network 810 is provided as a schematic representation of any neural network, rather than one having the specific configuration shown in FIG. 8, and thus the neural network may be a single layer or a multilayer neural networks, and may have any number of nodes (neurons). In the example of FIG. 8, the neural network is configured, based on its adapted behavior (in which breakpoint coefficients defining piecewise linear functions implemented on the links of the neural network have been adaptively trained using training data), to compute complex gains (g's) applied to a set of complex functions (which may include delayed terms) generated at a complex transformer 820 for a signal u[n]. It is to be noted that in some embodiments, at least some of the coefficients defining the piecewise linear functions implemented on the links of the neural network 810 may have been hand-picked (rather than determined adaptively during training). For example, the breakpoints of the piecewise linear functions realized on the links between an input layer of the neural network 810 and the first hidden layer may have been set to specific values that are more computationally efficient. The neural network 810 computes the complex gains in response to real phase-invariant functions (r's) derived from the complex basis functions. Further details regarding a DPD implementation to compute complex gains that weigh derived a set of transformed complex signals are provided in U.S. Pat. No. 10,523,159, entitled "Digital Compensator for a Non-Linear System," the content of which is incorporated herein by reference in its entirety.

Briefly, the predistorter system 800 performs a series of transformations that generate a diverse set of building blocks for forming the distortion term d[t] (at a summing node 832). As a first transformation, the complex transformer 820 (labelled Lc) receives the input signal, and outputs multiple transformed signals. The output of the transformer 820 is a set of complex baseband signals, w[.],which may be represented as a vector of signals and indexed $w_1[.]$, $w_2[.]$, ..., $w_{N_W}[.]$, where $N_W$ is the number of such signals (note that w[.] is different from the adjustable coefficients $w_k$, discussed above, that are used to adapt/train the behavior of the neural networks). These complex baseband signals form terms for constructing the distortion term (as a weighted summation of the set of baseband signals, where the weighting is time varying). The set of complex baseband signals may include the input itself, $w_1[t]=u[t]$, as well as well as various delays of that signal, for example, $w_k[t]=u[t-k+1]$ for $k=1, \ldots, N_W$. The delayed signals are derived using the Delays section 830.

A second stage is a real transformation component 840, labelled $L_R$ and also referred to as the "real layer." The real transformation component 840 receives the $N_W$ signals w[t] (and optionally also receives an envelope signal e) and outputs $N_R$ (generally greater than $N_W$) real signals r, in a bounded range (e.g., a range of [0,1], in some embodiments). The choice of real signals (functions) may depend on characteristics of a transmit chain (RF section 870) of a wireless device on which the DPD system 800 is implemented, and thus may be selected based on manufacturing or design-time considerations. In some embodiments, the DPD system 800 may be configured with a set of fixed parameters z, and values of a set of adaptation parameters x (determined using a training and adaptation unit 860). Very generally, the fixed parameters may determine the family of compensation functions that may be implemented by the predistorter, and the adaptation parameters may be used to adaptively update the piecewise linear functions implemented at one or more links of the neural network 810. The adaptation parameters, however, are not generally used to control the transformed complex signal (i.e., the w[t] signals generated by the transformer 820) or the real signals (i.e., the r signals, generated by the transformer 840). The training and adaptation unit 860 may initially (prior to commencement of regular operation) receive training data used to help define the functions realized on the links of the neural network 810 (e.g., through a procedure minimizing a loss metric between predictions made by the neural network 810 and pre-labeled instances using, for example, a stochastic gradient descent procedure). Subsequently, the neural network functions on the links (e.g., the vertical-axis values defining the heights associated with breakpoints of the linear segments of piecewise functions) may need to be adaptively adjusted at set intervals or in response to some predefined performance degradation metric. The adaptive adjustment of, for example, the values $w_k$ associated with break points of linear segments of piecewise linear functions (or the adjustment of other trainable coefficients, such as weights, that can be associated with the piecewise linear functions) may be realized according to a sensing of the signal passing between the power amplifier and the antenna of the transmit chain, and an RF sensor circuitry, demodulating the sensed signal to produce a representation of the signal band y[.], which is passed to the training and adaptation unit 860. The adaptation uses the inputs to the RF section (i.e., the transmit chain), namely v[.] and/or the input to the predistorter u[.] (e.g., according to the adaptation approach implemented), and optionally an envelope tracking signal e[.]. Some details about adaptation techniques that can be employed in conjunction with the present implementations are provided, for example, at U.S. Pat. No. 10,523,159, entitled "Digital Compensator for a Non-Linear System," U.S. patent application Ser. No. 16/004,594, entitled "Linearization System", and U.S. application Ser. No. 16/386,755, entitled "Linearization with Envelope Tracking or Average Power Tracking," the contents of which are all incorporated herein by reference in their entireties. Alternatively or additionally, in some embodiments, additional training data (which may be based on data generated by the neural network 810 during its normal operation) may be used to adjust the adjustable parameters of the neural network.

In some implementations, the real signals are scaled, for example, based on a fixed scale factor that is based on the expected level of the input signal u[t]. In some implementations, the fixed parameters for the system may include a scale (and optionally an offset) in order to achieve a typical range of [0,1]. The scale factors may be adapted to maintain the real values in the desired range. Each of the complex signals $w_k[t]$ may be passed to one or more corresponding non-linear functions, which accepts a complex value and outputs a real value r that does not depend on the phase of its input (i.e., the function is phase-invariant). Constructing the signals w and r can provide a diversity of signals from which the distortion term may be formed using a parameterized transformation.

As noted, the functions to which the r values are mapped may be parameterized by the adaptation parameters, which are determined by the adaptation and training section 860 section that may be used to determine (and optionally adapt during runtime) the functions implemented at links of the neural network 810. For example, the training and adaptation unit 860 may be used to train and/or adjust the vertical-axis values and/or weights associated with linear segments of the piecewise linear functions that are to be applied inputs provided to links.

Very generally, the adaptation parameters of the DPD system 800 may be selected to minimize a distortion between a desired output (i.e., input to the system) u[.], and the sensed output of the power amplifier y[.]. As noted, the distortion, d[t] is computed as the sum of complex basis functions $w_k$ (which includes delayed samples of such complex basis functions) weighed by the complex gain terms, g, produced in response to the real signals, r, produced by the real transformation component (transformer) $L_R$ 840. The adaptation parameters, which may be the values defining the piecewise constant or piecewise linear functions, may be updated in a gradient-based iteration based on a reference pair of signals (u[.], y[.]). In examples that make use of tables (for example with $2^S$ entries) to encode the non-linear functions (e.g., realized as piecewise linear functions), each entry may be estimated in the gradient procedure. In some embodiments, the values defining the piecewise linear function behavior may have been selected according to non-optimization criteria (e.g., simply based on choices made by an administrator), and then the adjustable coefficients associated with intervals of the piecewise linear function can be optimally adjusted during a training stage. Degradation in performance during runtime can subsequently be ameliorated based on further training, or according to some adaptation procedure (e.g., gradient-based adaptation procedure). In some examples, a smoothness or other regularity is enforced for these functions by limiting the number of degrees of freedom to less than $2^S$, for example, by estimating the non-linear function as a being in the span (linear combination) of a set of smooth basis functions. After estimating the combination of such functions, the table is then generated.

Thus, in some embodiments, a digital predistorter (DPD) system is provided that includes an input port for receiving an input signal (u), an output port for providing an output signal (v), and storage for values of a plurality of configuration parameters (x). The DPD system is configured to receive the input signal (u) via the input port, process the input signal (u) to produce a plurality of transformed signals (w), determine a plurality of phase-invariant derived signals (r), with each derived signal ($r_j$) of the plurality of derived signals being equal to a non-linear function of one or more of the transformed signals, at least some of the derived signals being equal to functions of different one or more of the transformed signals. The system is further configured to transform each derived signal ($r_j$) of the plurality of phase-invariant derived signals according to a parametric non-linear transformation implemented through a neural network to produce a time-varying gain component ($g_i$) of a plurality of gain components (g). The neural network includes a plurality of nodes, the nodes forming at plurality of layers including an input layer, at least one hidden layer, and an output layer, and a plurality of links, each link coupling a corresponding source node and a receiving node of the plurality of nodes. At least one link of the plurality of links is configured to evaluate a piecewise linear function of a value provided by a first source node, from the plurality of nodes, to yield a value for a first receiving node coupled to the at least one link, and each node of a hidden layer is configured to aggregate values provided by links for which that node is the receiving node of the link, with the first receiving node providing a non-linear output resulting, in part, from the at least one link, directed to the first receiving node, configured to evaluate the piecewise linear function. The DPD system is further configured to form a distortion term by accumulating a plurality of terms, each term being a product of a transformed signal of the plurality of transformed signals and a time-varying gain, the time-varying gain being a function of a one or more of the phase-invariant derived signals, the function of the one or more of the phase-invariant derived signals being decomposable into a combination of one or more parametric functions of a corresponding single one of the time-varying gain components ($g_i$), and provide the output signal (v) determined from the distortion term via the output port.

Computation Method

Figure 9:
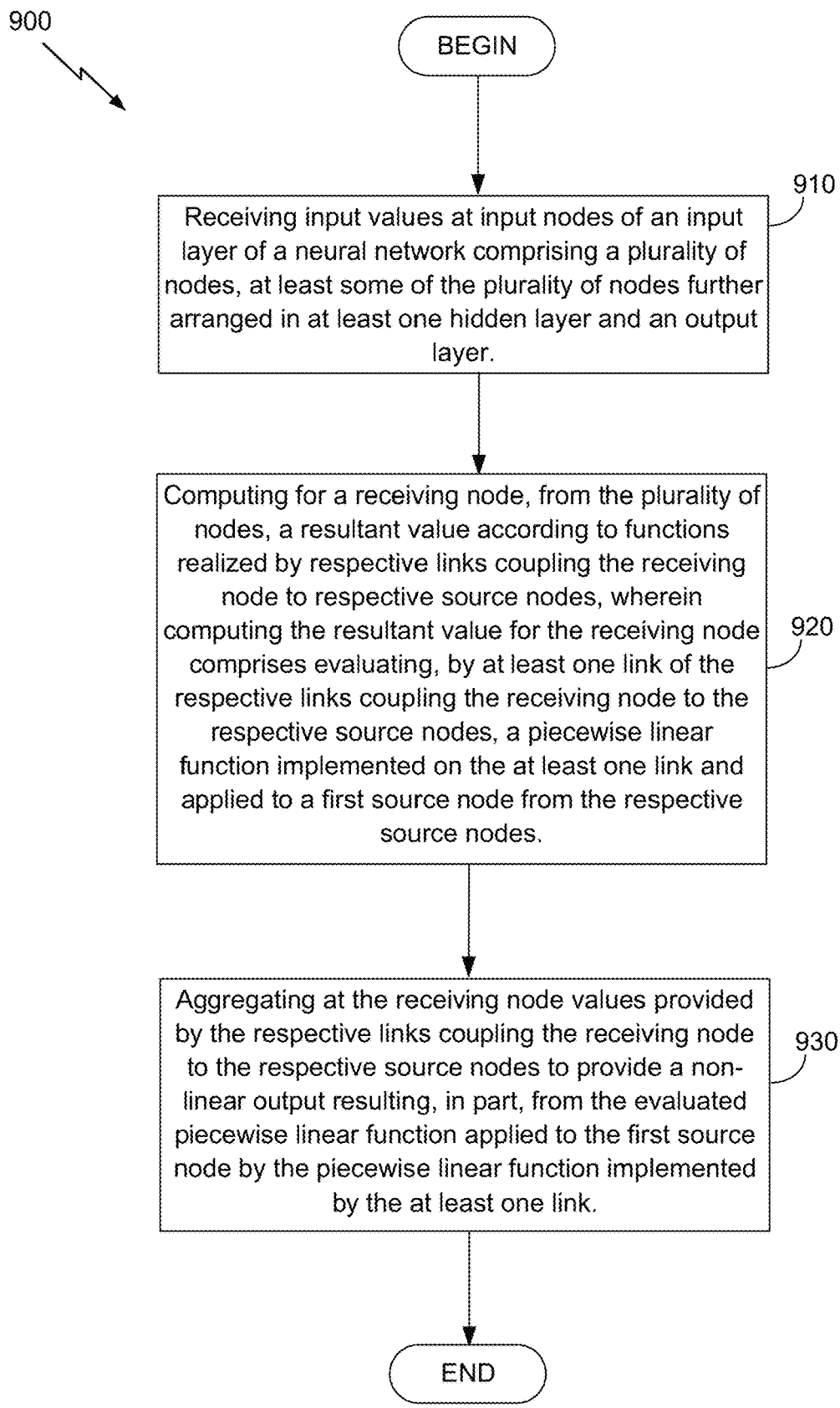
FIG. 9 is a flowchart of a procedure performed at a neural network (such as the structures depicted, for example, at FIGS. 1 and 4) to facilitate neural-network-based computations.

With reference to FIG. 9, a flowchart of a procedure 900, performed at a neural network (such as the structures depicted, for example, at FIGS. 1, 2, 4, 5, and 8) to facilitate neural-network-based computations, is shown. The procedure 900 improves the efficiency and reduces the complexity of conventional neural networks. The procedure 900 includes receiving 910 input values at input nodes of an input layer of a neural network (such as the neural network 100 described herein) comprising a plurality of nodes, with at least some of the plurality of nodes further arranged in at least one hidden layer and an output layer.

The procedure 900 further includes computing 920 for a receiving node, from the plurality of nodes, a resultant value according to functions realized by respective links coupling the receiving node to respective source nodes. Computing the resultant value for the receiving node includes evaluating, by at least one link of the respective links coupling the receiving node to the respective source nodes, a piecewise linear function implemented on the at least one link and applied to a first source node from the respective source nodes. Examples of the piecewise linear functions that can be implemented at the links of the neural network include piecewise linear functions such as those shown in FIGS. 3A and 3B.

In some examples, computing the resultant value for the receiving node may include evaluating by multiple links of the respective links coupling the receiving node to the respective source nodes, piecewise linear functions implemented on the multiple links. Evaluating the piecewise linear function may include evaluating the piecewise linear function according to a plurality of adjustable coefficients defining respective linear sections of the piecewise linear function. In such embodiments, the procedure may include retrieving, from a table storing data for the plurality of sections of the piecewise linear function, an adjustable coefficient and data for a particular linear segment of the piecewise linear function based on a value of the first node (the data may be stored in tables arranged according to the examples discussed in relation to FIG. 6 and FIGS. 7A-C). In some implementations, the procedure may further include deriving the adjustable coefficients according to training data used to minimize a loss measure between predictions made by the neural network and pre-labeled instances.

In some examples, evaluating the piecewise linear function may include evaluating the piecewise linear function according to:

$$f(x; \vec{w}) = \begin{cases} \left(\frac{x - a_0}{a_1 - a_0}\right)w_1 + \left(\frac{a_1 - x}{a_1 - a_0}\right)w_0 & x < a_1 \\ \left(\frac{x - a_k}{a_{k+1} - a_k}\right)w_{k+1} + \left(\frac{a_{k+1} - x}{a_{k+1} - a_k}\right)w_k, & a_k \leq x \leq a_{k+1}, k = 1, \ldots, n-2 \\ \left(\frac{x - a_{n-1}}{a_n - a_{n-1}}\right)w_n + \left(\frac{a_n - x}{a_n - a_{n-1}}\right)w_{n-1} & x \geq a_{n-1} \end{cases}$$

where $a_0 < a_1 < \ldots < a_n$ are pre-determined n+1 ordered break points, and $w_k$, $0 \leq k \leq n+1$, are the corresponding trainable coefficients.

With continued reference to FIG. 9, the procedure 900 additionally includes aggregating 930 at the receiving node values provided by the respective links coupling the receiving node to the respective source nodes to provide a non-linear output resulting, in part, from the evaluated piecewise linear function applied to the first source node by the piecewise linear function implemented by the at least one link.

As discussed, in some examples, piecewise linear functions may be defined as a composite of basis functions. Thus, in such examples, the at least one link implementing the piecewise linear function may include a first set of intermediate links extending from the first source node into intermediate nodes located between a first layer comprising the first source node and a second layer comprising the receiving node, and a second set of intermediate links extending from output of the intermediate nodes to the receiving node, with each of the multiple links and respective intermediate nodes realizing a respective basis function such that the composite of outputs directed from the intermediate nodes to the first receiving node through the second set of intermediate links realizes the piecewise linear function.

Limited Precision Computation

The storage of digital quantities, and/or results performing of arithmetic computations (e.g., multiplications), may have limited precision, for example, being represented in a fixed-point form with a limited number of bits (e.g., as an integer, or as integer multiple of constant value) or in a floating point form with a limited number of bits used to represent the mantissa (i.e., with the mantissa representing an integer multiple of a constant raised to a variable integer exponent). For example, fixed-point quantities may use 8 or 16 bits, and floating point quantities may use 24 bits (e.g., IEEE floating point format) or 7 bits (e.g., "Bfloat16" format). In some implementations, the parameter estimation ("training") procedures described above may be performed without consideration of the limited precision, and at the completion of the procedure, the quantities can be rounded, clamped at extreme values, and/or otherwise coerced for storage.

Preferably, the limited precision is taken into account during the parameter estimation procedure, thereby yielding improved performance as compared to the rounding approach. Two such approaches are described below. In a first, random disturbances such as to mimic the effect of quantization ("quantization noise") are added at intermediate computations in a neural network during training. In a second, the training procedure penalizes values that not allowed in the limited precision format in storage and/or in results of arithmetic operations, and the training procedure naturally adapts to values that are allowed or are close to allowed values, thereby reducing the impact of rounding after training.

In the first approach, the output of any computation (e.g., a hidden unit) or storage (e.g., a coefficient of a piecewise linear function) is subject to a disturbance selected uniformly from a range of $[-r/2, r/2]$ where r is the value on a least significant increment at the current value. Not that procedures that rely on differentiability of the functions implemented by the computations are not impacted because the addition of the random disturbance does not affect the derivatives used in training.

In the second approach, a penalty is applied to each stored or computed value that is used to the degree that the value deviates from a closest limited precision representation. For example, with an n bit integer representation that can exactly represent integers in the range $[-2^n, 2^n -1]$, a penalty applied to a higher precision value w can be represented as $$R(w) = |(w-q)(w-q+1)|$$

where $$q = \begin{cases} -2^{n-1} & \text{if } w \le -2^{n-1} \\ 2^{n-1} - 1 & \text{if } w \ge 2^{n-1} - 1 \\ \lfloor w \rfloor & \text{otherwise} \end{cases}$$

where

Note that the penalty is zero when the higher precision value is an integer in the representable range, and the penalty is positive and differentiable when the higher precision value is non-integer. This same type of penalty function can be defined with other limited precision formats, for example, for scaled integer formats where the least significant increment is equal to r in which case we can redefine $$q = \begin{cases} -r2^{n-1} & \text{if } w/r \le -2^{n-1} \\ r(2^{n-1} - 1) & \text{if } w/r \ge 2^{n-1} - 1 \\ r\lfloor w/r \rfloor & \text{otherwise} \end{cases}.$$

During training, an overall loss function $L(w_1, \ldots, w_K)$ is augmented with a term $\lambda \Sigma_k R(w_k)$, where the scale factor $\lambda$ is increased during training. Note that when $\lambda=0$, no finite precision penalty is applied. As the scale factor is increased, the resulting values approach values representable in the finite precision format. At the end of the training procedure when the scale factor has reached a final value, the resulting parameters are rounded to exactly conform to the finite precision formats.

As also discussed, one type of application in which the neural network-based computation methodology of the procedure 900 can be used is to facilitate digital predistortion processing. In such situations, the procedure 900 may further include generating, at the output layer a plurality of time-varying gain components (g) in response to a plurality of phase-invariant derived signals (r) received at the input nodes of the input layer, with each derived signal ($r_j$) of the plurality of derived signals being determined as a non-linear function of one or more transformed signals (w) derived from an input signal (u). The procedure may, in these situation, further include forming a distortion term by accumulating a plurality of terms, each term being a product of a transformed signal of the one or more transformed signals (w) and a time-varying gain, the time-varying gain being a function of a one or more of the phase-invariant derived signals (r), with the function of the one or more of the phase-invariant derived signals being decomposable into a combination of one or more parametric functions of a corresponding single one of the time-varying gain components ($g_i$), and combining the distortion term with the input signal (u) to mitigate non-linear distortions caused by an amplification system configured to process the input signal (u). The neural networks described herein can also be used with other types of applications (including other types of DPD procedures and other types of signal processing).

Figure 10:
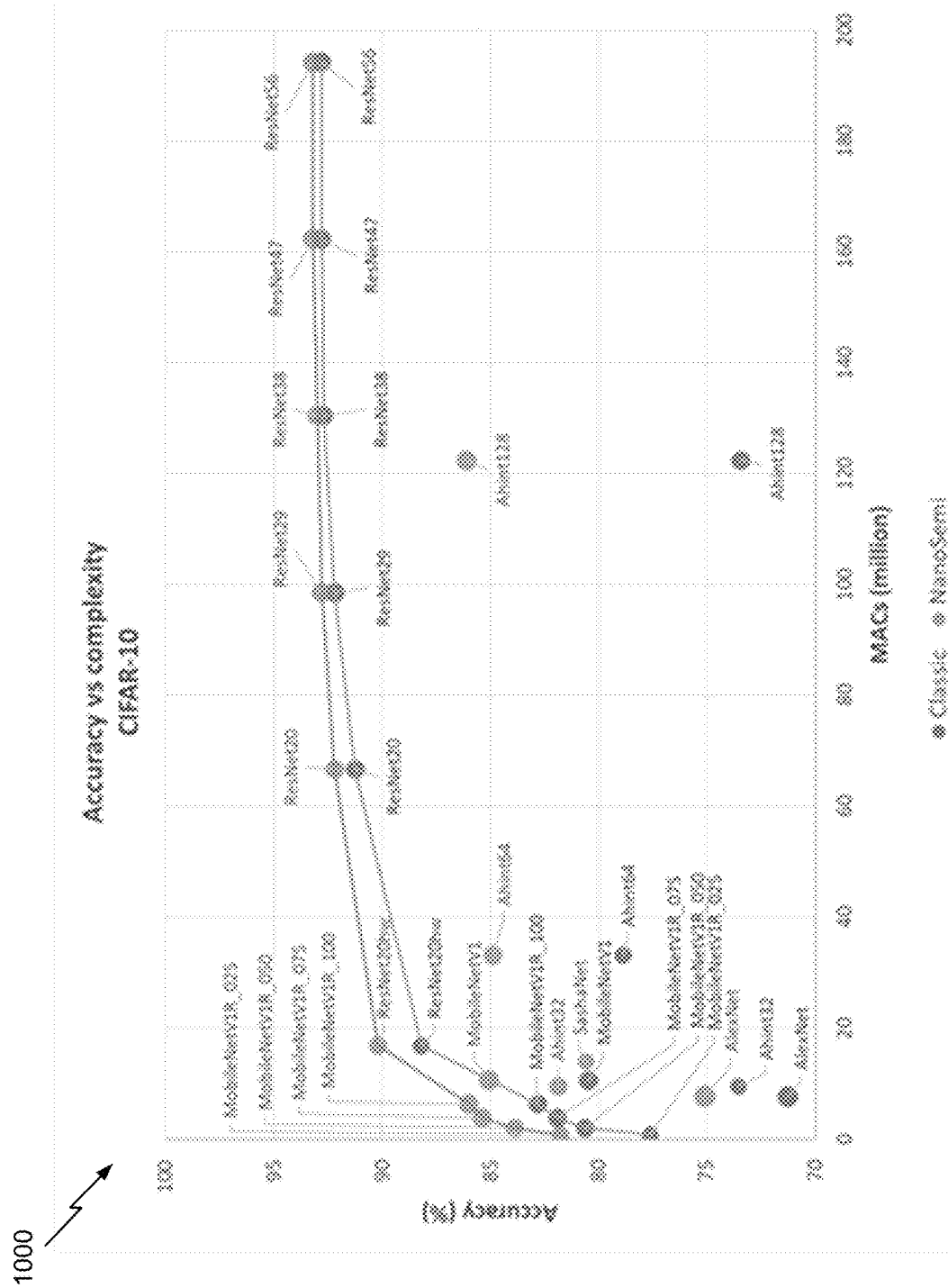
FIG. 10 is a graph comparing performance of an implementation of the improved neural network to that of a conventional neural network for the task of image classification using the CIFAR-10 dataset.

Performance of some of the implementations described herein were tested to compare them to the performance of standard neural networks. FIG. 10 shows a graph 1000 comparing performance of an implementation of the improved neural network to that of a conventional neural network for the task of image classification using the CIFAR-10 dataset. For models of small to medium computational intensity, models that use implementations of the improved neural network (in which one or more links between nodes realize a piecewise linear function) can achieve the same accuracy of as standard models with up to with four (4) times lower computation complexity. The graph of FIG. 10 is based on an implementation using basis functions. This implementation was realized using the TensorFlow library and the models were trained using gradient descent techniques on GPU accelerators.

In some implementations, a computer accessible non-transitory storage medium includes a database (also referred to a "design structure" or "integrated circuit definition dataset") representative of a system including some or all of the components of the neural network implementations described herein. Generally speaking, a computer accessible storage medium may include any non-transitory storage media accessible by a computer during use to provide instructions and/or data to the computer. For example, a computer accessible storage medium may include storage media such as magnetic or optical disks and semiconductor memories. Generally, the database representative of the system may be a database or other data structure which can be read by a program and used, directly or indirectly, to fabricate the hardware comprising the system. For example, the database may be a behavioral-level description or register-transfer level (RTL) description of the hardware functionality in a high-level design language (HDL) such as Verilog or VHDL. The description may be read by a synthesis tool which may synthesize the description to produce a netlist comprising a list of gates from a synthesis library. The netlist comprises a set of gates which also represents the functionality of the hardware comprising the system. The netlist may then be placed and routed to produce a data set describing geometric shapes to be applied to masks. The masks may then be used in various semiconductor fabrication steps to produce a semiconductor circuit or circuits corresponding to the system. In other examples, the database may itself be the netlist (with or without the synthesis library) or the data set.

Some of the implementations described herein, as illustrated in FIGS. 1-10, can be used in a wide range of applications and technologies that include, for example, signal processing technologies (such as digital predistortion processes), beam forming technologies, machine vision technologies, speech processing (e.g., speech recognition) technologies, and all other applications where a neural network, such as the neural networks described herein, can be used to perform at least some of the operations associated with such applications. Additionally, the neural networks described herein can be arranged according to any type of neural network configuration, including as feedforward neural networks, convolution neural networks, fully connected neural networks, partially-connected neural networks, etc.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate in the context of the systems, devices, circuits, methods, and other implementations described herein.

As used herein, including in the claims, "or" as used in a list of items prefaced by "at least one of" or "one or more of" indicates a disjunctive list such that, for example, a list of "at least one of A, B, or C" means A or B or C or AB or AC or BC or ABC (i.e., A and B and C), or combinations with more than one feature (e.g., AA, AAB, ABBC, etc.). Also, as used herein, unless otherwise stated, a statement that a function or operation is "based on" an item or condition means that the function or operation is based on the stated item or condition and may be based on one or more items and/or conditions in addition to the stated item or condition.

Although particular embodiments have been disclosed herein in detail, this has been done by way of example for purposes of illustration only, and is not intended to be limit the scope of the invention, which is defined by the scope of the appended claims. Features of the disclosed embodiments can be combined, rearranged, etc., within the scope of the invention to produce more embodiments. Some other aspects, advantages, and modifications are considered to be within the scope of the claims provided below. The claims presented are representative of at least some of the embodiments and features disclosed herein. Other unclaimed embodiments and features are also contemplated.

What is claimed is:

1. A machine-implemented artificial neural network computing apparatus comprising:

a plurality of nodes, the nodes forming at plurality of layers including an input layer, at least one hidden layer, and an output layer; and a plurality of links, each link coupling a corresponding source node and a receiving node of the plurality of nodes, the source nodes being in a first layer and the receiving nodes being in a second layer, the source nodes including a first source node and a second source node, and the receiving nodes including a first receiving node and a second receiving node, and the links include separate links coupling the first source node to the first receiving node, the first source node to the second receiving node, the second source node to the first receiving node, and the second source node to the second receiving node;

wherein each link of the separate links is configured to evaluate a respective different piecewise linear function of a value provided by its respective source node to yield a value for its respective receiving node;

and wherein each node of a hidden layer is configured to aggregate values provided by links for which that node is the receiving node of the link, with the first receiving node providing non-linear output resulting, in part, from the piecewise linear functions evaluated on links coupling the first source node to the first receiving node and coupling the second source node to the first receiving node to yield the value for the first receiving node, and the second receiving node providing non-linear output resulting, in part, from the piecewise linear functions evaluated on links coupling the first source node to the second receiving node and coupling the second source node to the second receiving node to yield the value for the second receiving node;

and wherein the computing apparatus comprises computing circuitry for concurrent evaluation of the different piecewise linear functions for the separate links.

2. The artificial neural network computing apparatus of claim 1, wherein multiple ones of the plurality of links are configured to evaluate respective piecewise linear functions based on input values from respective source nodes coupled to the multiple ones of the plurality of links.

3. The artificial neural network computing apparatus of claim 1, wherein at least one link configured to evaluate the piecewise linear function is configured to evaluate the piecewise linear function defined according to a plurality of adjustable coefficients defining respective linear sections of the piecewise linear function.

4. The artificial neural network computing apparatus of claim 3, wherein the adjustable coefficients are retrieved from a table storing data for the plurality of sections of the piecewise linear function, wherein each linear section is represented based on breakpoints associated with the respective linear sections.

5. The artificial neural network computing apparatus of claim 3, wherein the adjustable coefficients are computed according to training data used to minimize a loss measure between predictions made by the neural network and pre-labeled instances.

6. The artificial neural network computing apparatus of claim 3, wherein the piecewise linear function is represented according to:

$$f(x; \vec{w}) = \begin{cases} \left(\frac{x - a_0}{a_1 - a_0}\right)w_1 + \left(\frac{a_1 - x}{a_1 - a_0}\right)w_0 & x < a_1 \\ \left(\frac{x - a_k}{a_{k+1} - a_k}\right)w_{k+1} + \left(\frac{a_{k+1} - x}{a_{k+1} - a_k}\right)w_k, & a_k \leq x \leq a_{k+1}, k = 1, \ldots, n-2 \\ \left(\frac{x - a_{n-1}}{a_n - a_{n-1}}\right)w_n + \left(\frac{a_n - x}{a_n - a_{n-1}}\right)w_{n-1} & x \geq a_{n-1} \end{cases}$$

where $a_0 < a_1 < \ldots < a_n$ are pre-determined n+1 ordered break points, and $w_k$, $0 \leq k \leq n+1$, are the adjustable coefficients.

7. The artificial neural network computing apparatus of claim 1, wherein the non-linear output of the first receiving node is computed entirely based on the sum of the values produced by the links to the first receiving node without requiring an activation function applied to the computed sum of values at the first receiving node.

8. The artificial neural network computing apparatus of claim 1, wherein at least one link of the plurality of links configured to evaluate the piecewise linear function comprises:
a first set of intermediate links extending from the first source node into intermediate nodes located between a first layer comprising the first source node and a second layer comprising the first receiving node, and a second set of intermediate links extending from output of the intermediate nodes to the first receiving node, each of the intermediate links and respective intermediate nodes realizing a respective basis function such that a composite of outputs directed from the intermediate nodes to the first receiving node through the second set of intermediate links realizes the piecewise linear function.

9. The artificial neural network computing apparatus of claim 8, wherein each of the respective basis function comprises a rectifier linear unit (ReLU) function.

10. The artificial neural network computing apparatus of claim 1, wherein the output layer is configured to produce a plurality of time-varying gain components (g) in response to a plurality of phase-invariant derived signals (r) provided at the input layer, wherein each derived signal ($r_j$) of the plurality of derived signals is determined as a non-linear function of one or more transformed signals (w) derived from an input signal (u);
wherein a distortion term is formed by accumulating a plurality of terms, each term being a product of a transformed signal of the one or more transformed signals (w) and a time-varying gain, the time-varying gain being a function of a one or more of the phase-invariant derived signals (r), the function of the one or more of the phase-invariant derived signals being decomposable into a combination of one or more parametric functions of a corresponding single one of the time-varying gain components ($g_i$), and wherein the distortion term is combined with the input signal (u) to mitigate non-linear distortions caused by an amplification system configured to process the input signal (u).

11. The artificial neural network computing apparatus of claim 1, further comprising storage circuitry coupled to the computing circuitry for a plurality of table data representing sections for the piecewise linear functions.

12. The artificial neural network computing apparatus of claim 1, wherein the computing circuitry comprises a graphics processing unit (GPU) for concurrent evaluations of the piecewise linear functions of respective input values.

13. The artificial neural network computing apparatus of claim 12, wherein the GPU comprises storage providing concurrently access to data representing section for the piecewise linear functions.

14. A method for operating a computing apparatus implementing an artificial neural network comprising:
receiving input values at input nodes of an input layer of a neural network comprising a plurality of nodes, at least some of the plurality of nodes further arranged in at least one hidden layer and an output layer;
computing for a first receiving node, from the plurality of nodes, a resultant value according to functions realized by respective links coupling the first receiving node to respective source nodes including a first source node and a second source node, wherein computing the resultant value for the receiving node comprises evaluating, by at least one link of the respective links coupling the receiving node to the respective source nodes, a piecewise linear function implemented on the at least one link and applied to a first source node from the respective source nodes, including a first piecewise linear function implemented on the link coupling the first source node to the first receiving node and a second piecewise linear function implemented on the link coupling the second source node to the first receiving node;
aggregating at the first receiving node values provided by the respective links coupling the receiving node to the respective source nodes to provide a non-linear output resulting, in part, from the evaluated piecewise linear function applied to the first source node by the piecewise linear function implemented by the at least one link; and
computing for a second receiving node, from the plurality of nodes, a resultant value according to functions realized by respective links coupling the second receiving node to respective source nodes including the first source node and the second source node, wherein computing the resultant value for the receiving node comprises evaluating, by at least one link of the respective links coupling the receiving node to the respective source nodes, a piecewise linear function implemented on the at least one link and applied to a first source node from the respective source nodes, including a third piecewise linear function implemented on the link coupling the first source node to the second receiving node and a fourth piecewise linear function implemented on the link coupling the first source node to the second receiving node, wherein the first, second, third, and forth piecewise linear functions are distinct functions;

wherein computing the resultant value for the receiving node comprises evaluating by multiple links of the respective links coupling the receiving node to the respective source nodes, piecewise linear functions implemented on the multiple links; and wherein the evaluating comprises concurrent computation using computing circuitry of the computing apparatus of multiple of the piecewise linear functions.

15. The method of claim 14, wherein evaluating the piecewise linear function comprises:

evaluating the piecewise linear function according to a plurality of adjustable coefficients defining respective linear sections of the piecewise linear function.

16. The method of claim 15, further comprising:

retrieving from a table storing data for the plurality of sections of the piecewise linear function, an adjustable coefficient and data for a particular linear segment of the piecewise linear function based on a value of the first node.

17. The method of claim 15, further comprising:

deriving the adjustable coefficients according to training data used to minimize a loss measure between predictions made by the neural network and pre-labeled instances.

18. The method of claim 15, wherein evaluating the piecewise linear function comprises:

evaluating the piecewise linear function according to:

$$f(x; \vec{w}) = \begin{cases} \left(\frac{x - a_0}{a_1 - a_0}\right)w_1 + \left(\frac{a_1 - x}{a_1 - a_0}\right)w_0 & x < a_1 \\ \left(\frac{x - a_k}{a_{k+1} - a_k}\right)w_{k+1} + \left(\frac{a_{k+1} - x}{a_{k+1} - a_k}\right)w_k, & a_k \le x \le a_{k+1}, k = 1, \ldots, n-2 \\ \left(\frac{x - a_{n-1}}{a_n - a_{n-1}}\right)w_n + \left(\frac{a_n - x}{a_n - a_{n-1}}\right)w_{n-1} & x \ge a_{n-1} \end{cases}$$

where $a_0 < a_1 < \ldots < a_n$ are pre-determined n+1 ordered break points, and $w_k$, $0 \le k \le n+1$, are the adjustable coefficients.

19. The method of claim 14, wherein the at least one link implementing the piecewise linear function comprises:

a first set of intermediate links extending from the first source node into intermediate nodes located between a first layer comprising the first source node and a second layer comprising the receiving node, and a second set of intermediate links extending from output of the intermediate nodes to the receiving node, each of the multiple links and respective intermediate nodes realizing a respective basis function such that a composite of outputs directed from the intermediate nodes to the first receiving node through the second set of intermediate links realizes the piecewise linear function.

20. The method of claim 14, further comprising:

generating, at the output layer a plurality of time-varying gain components (g) in response to a plurality of phase-invariant derived signals (r) received at the input nodes of the input layer, wherein each derived signal ($r_j$) of the plurality of derived signals is determined as a non-linear function of one or more transformed signals (w) derived from an input signal (u);

forming a distortion term by accumulating a plurality of terms, each term being a product of a transformed signal of the one or more transformed signals (w) and a time-varying gain, the time-varying gain being a function of a one or more of the phase-invariant derived signals (r), the function of the one or more of the phase-invariant derived signals being decomposable into a combination of one or more parametric functions of a corresponding single one of the time-varying gain components ($g_i$); and combining the distortion term with the input signal (u) to mitigate non-linear distortions caused by an amplification system configured to process the input signal (u).

21. A design structure encoded on a non-transitory machine-readable medium, said design structure comprising elements that, when executed by a processor in a computer-aided design system, generate a machine-executable representation of an artificial neural network computing circuitry comprising:

a receiving circuit to receiving input values at input nodes of an input layer of the neural network comprising a plurality of nodes, at least some of the plurality of nodes further arranged in at least one hidden layer and an output layer;

a computing circuit to compute for a first receiving node, from the plurality of nodes, a first resultant value according to functions realized by respective links coupling the first receiving node to respective source nodes including a first source node and a second source node, wherein computing the first resultant value for the receiving node comprises evaluating, by at least one link of the respective links coupling the first receiving node to the respective source nodes, a piecewise linear function implemented on the at least one link and applied to a first source node from the respective source nodes, including a first piecewise linear function implemented on the link coupling the first source node to the first receiving node and a second piecewise linear function implemented on the link coupling the second source node to the first receiving node;

an aggregation circuit to aggregate at the first receiving node values provided by the respective links coupling the first receiving node to the respective source nodes to produce a non-linear output based, in part, on the evaluated piecewise linear function applied to the first source node by the piecewise linear function implemented by the at least one link; and computing circuit to compute for a second receiving node, from the plurality of nodes, a second resultant value according to functions realized by respective links coupling the second receiving node to respective source nodes including the first source node and the second source node, wherein computing the second resultant value for the second receiving node comprises evaluating, by at least one link of the respective links coupling the second receiving node to the respective source nodes, a piecewise linear function implemented on the at least one link and applied to a first source node from the respective source nodes, including a third piecewise linear function implemented on the link coupling the first source node to the second receiving node and a fourth piecewise linear function implemented on the link coupling the first source node to the second receiving node, wherein the first, second, third, and forth piecewise linear functions are distinct functions;

wherein computing the first resultant value for the first receiving node comprises evaluating by multiple links of the respective links coupling the first receiving node to the respective source nodes, piecewise linear functions implemented on the multiple links; and wherein the computing circuitry comprises computing circuitry for concurrent evaluation of the distinct piecewise linear functions for the separate links.

\* \* \* \* \*